United States Patent
Hiraya et al.

(10) Patent No.: US 8,627,789 B2
(45) Date of Patent: Jan. 14, 2014

(54) CONTROL APPARATUS FOR A CYLINDER DIRECT-INJECTION INTERNAL COMBUSTION ENGINE

(75) Inventors: Koji Hiraya, Yokohama (JP); Daisuke Tanaka, Yokosuka (JP); Shunsuke Shigemoto, Yokohama (JP); Hirofumi Tsuchida, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 283 days.

(21) Appl. No.: 12/866,906

(22) PCT Filed: Feb. 19, 2009

(86) PCT No.: PCT/IB2009/000299
§ 371 (c)(1),
(2), (4) Date: Sep. 22, 2010

(87) PCT Pub. No.: WO2009/109819
PCT Pub. Date: Sep. 11, 2009

(65) Prior Publication Data
US 2011/0005496 A1    Jan. 13, 2011

(30) Foreign Application Priority Data

Mar. 3, 2008 (JP) ................................. 2008-052342
Jan. 23, 2009 (JP) ................................. 2009-012699

(51) Int. Cl.
*F02B 75/04* (2006.01)
(52) U.S. Cl.
USPC .................. 123/48 R; 123/48 B; 123/179.16
(58) Field of Classification Search
USPC .......... 123/48 R, 48 B, 78 R, 78 A, 294, 311, 123/179.16
See application file for complete search history.

(56) References Cited

U.S. PATENT DOCUMENTS 2,087,233 A * 7/1937 Alden ........................... 123/462
2,768,615 A * 10/1956 Taylor et al. .................. 123/301
(Continued)

FOREIGN PATENT DOCUMENTS

CN          1512050 A    7/2004
CN        101035976 A    9/2007
(Continued)

OTHER PUBLICATIONS

Machine translation of JP 2009236107 A, see "JP2009236107A_translation.pdf".*

*Primary Examiner* — Noah Kamen
*Assistant Examiner* — Long T Tran
(74) *Attorney, Agent, or Firm* — Drinker Biddle & Reath LLP

(57) ABSTRACT

A control apparatus is provided for a four stroke cylinder direct-injection internal combustion engine having a cylinder and a piston disposed within the cylinder. The control apparatus includes a variable compression ratio mechanism for variably controlling the engine compression ratio by changing the top dead center position of the piston and a fuel injection device for injecting fuel directly into the cylinder. When the actual compression ratio of the engine is higher than a target compression ratio, the variable compression ratio mechanism reduces the compression ratio, and in accordance with the reduction in the compression ratio, the fuel injecting device injects an intake fuel injection amount in the intake stroke and a compression fuel injection amount in the compression stroke, and the timing for starting the fuel injection in the compression stroke is retarded.

20 Claims, 14 Drawing Sheets

(56) References Cited

U.S. PATENT DOCUMENTS

| | | | |
|---|---|---|---|
| 4,796,591 A * | 1/1989 | Kiyono et al. | 123/492 |
| 4,856,463 A * | 8/1989 | Johnston | 123/51 BA |
| 5,613,475 A * | 3/1997 | Firey | 123/496 |
| 5,644,073 A * | 7/1997 | Matsuno et al. | 73/114.79 |
| 6,029,622 A * | 2/2000 | Kadota et al. | 123/295 |
| 6,209,516 B1 * | 4/2001 | Yamashita | 123/305 |
| 6,240,724 B1 * | 6/2001 | Kudou et al. | 60/284 |
| 6,636,797 B2 * | 10/2003 | Yoshizawa et al. | 701/104 |
| 6,883,490 B2 * | 4/2005 | Jayne | 123/260 |
| 6,947,830 B1 * | 9/2005 | Froloff et al. | 701/111 |
| 6,990,934 B2 * | 1/2006 | Sugiyama et al. | 123/48 B |
| 7,370,616 B2 * | 5/2008 | Kuo et al. | 123/90.15 |
| 7,469,181 B2 * | 12/2008 | Duffy et al. | 701/108 |
| 2002/0078918 A1 * | 6/2002 | Ancimer et al. | 123/295 |
| 2007/0074702 A1 * | 4/2007 | Nakamura et al. | 123/299 |
| 2007/0227503 A1 * | 10/2007 | Hitomi et al. | 123/406.45 |
| 2008/0208440 A1 * | 8/2008 | Hiramatsu | 701/113 |
| 2008/0271436 A1 * | 11/2008 | Najt et al. | 60/285 |

FOREIGN PATENT DOCUMENTS

| | | |
|---|---|---|
| JP | 10-231744 | 9/1998 |
| JP | 2002-21613 | 1/2002 |
| JP | 2005-226486 | 8/2005 |
| JP | 2006-125376 | 5/2006 |
| JP | 2007-263042 | 10/2007 |
| JP | 2008-19873 | 1/2008 |
| JP | 2009236107 A * | 10/2009 |

\* cited by examiner

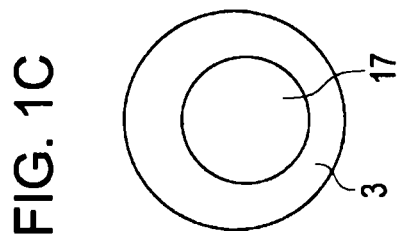
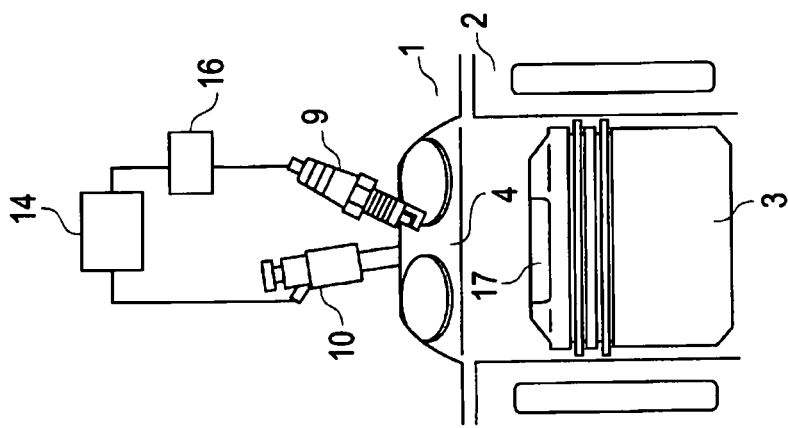
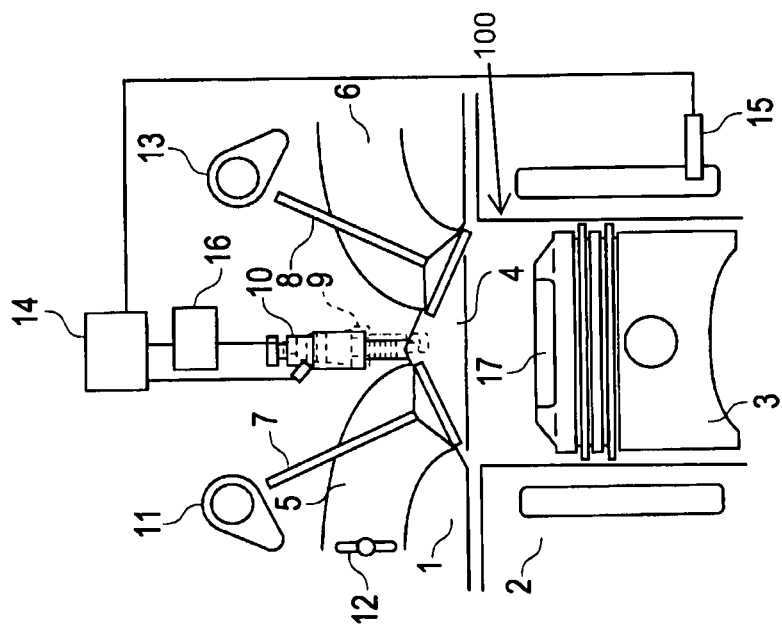

FIG. 3A
FIG. 3B
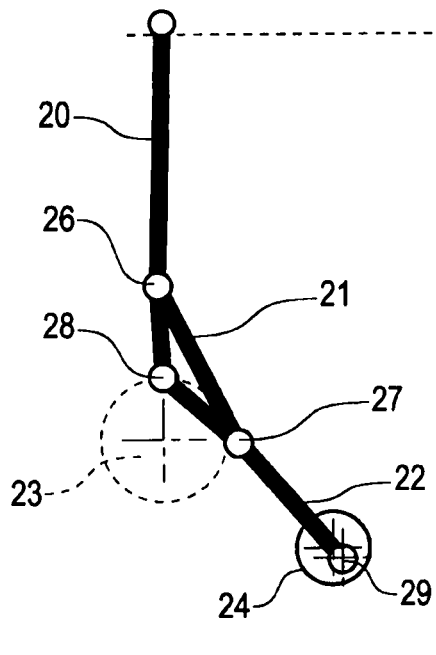
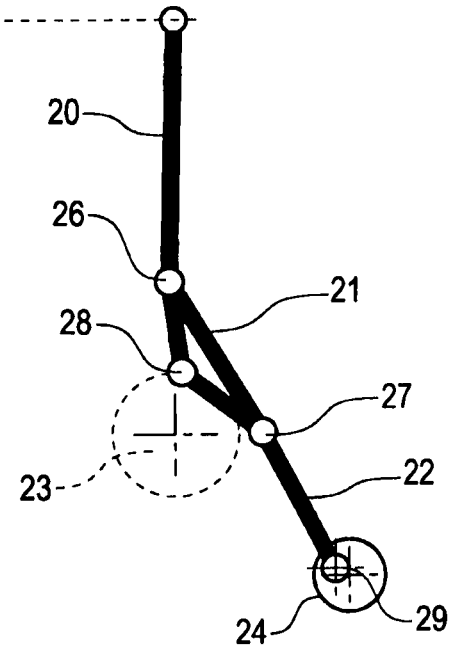

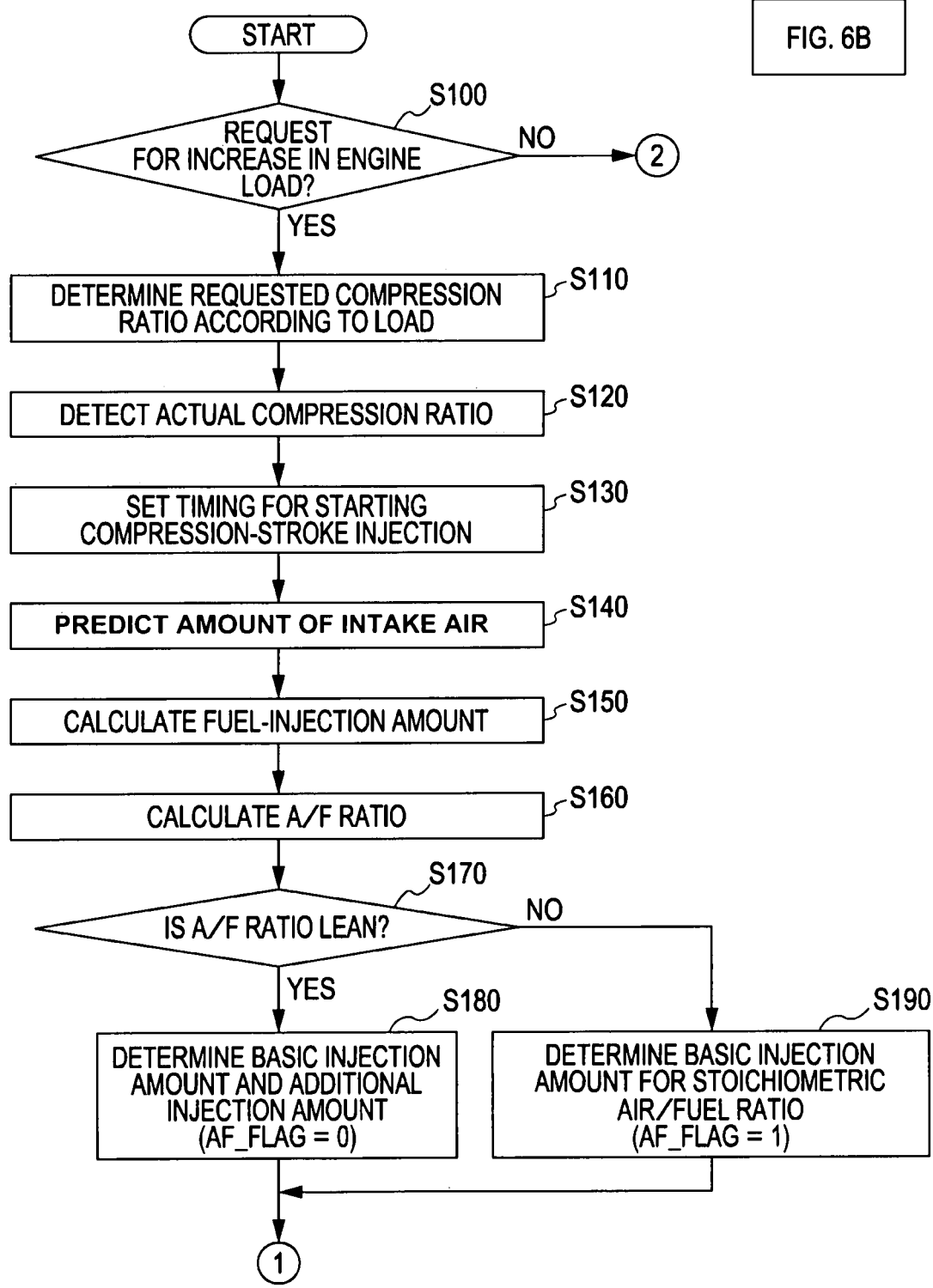

FIG. 8

|  |  | AMOUNT-OF-INTAKE-AIR/ REQUESTED-INJECTION-AMOUNT IS LEAN (AF_FLAG = 0) | AMOUNT-OF-INTAKE-AIR/ REQUESTED-INJECTION-AMOUNT IS EQUAL TO OR RICHER THAN STOICHIOMETRIC RATIO (AF_FLAG = 1) |
|---|---|---|---|
| ACTUAL ε > PREDETERMINED ε | A+B ≥ BASIC INJECTION AMOUNT | STOICHIOMETRIC: (INTAKE-STROKE INJECTION + COMPRESSION-STROKE INJECTION) (2) | (1) STOICHIOMETRIC: (INTAKE-STROKE INJECTION + COMPRESSION-STROKE INJECTION) |
|  | A+B < BASIC INJECTION AMOUNT | LEAN: (INTAKE-STROKE INJECTION + COMPRESSION-STROKE INJECTION) + ADDITIONAL FUEL: EXPANSION-STROKE INJECTION | (3) STOICHIOMETRIC: (TWO INTAKE-STROKE INJECTIONS + COMPRESSION-STROKE INJECTION) |
| ACTUAL ε ≤ PREDETERMINED ε |  | (4) LEAN: INTAKE-STROKE INJECTION + ADDITIONAL FUEL: EXPANSION-STROKE INJECTION | (5) STOICHIOMETRIC: INTAKE-STROKE INJECTION |

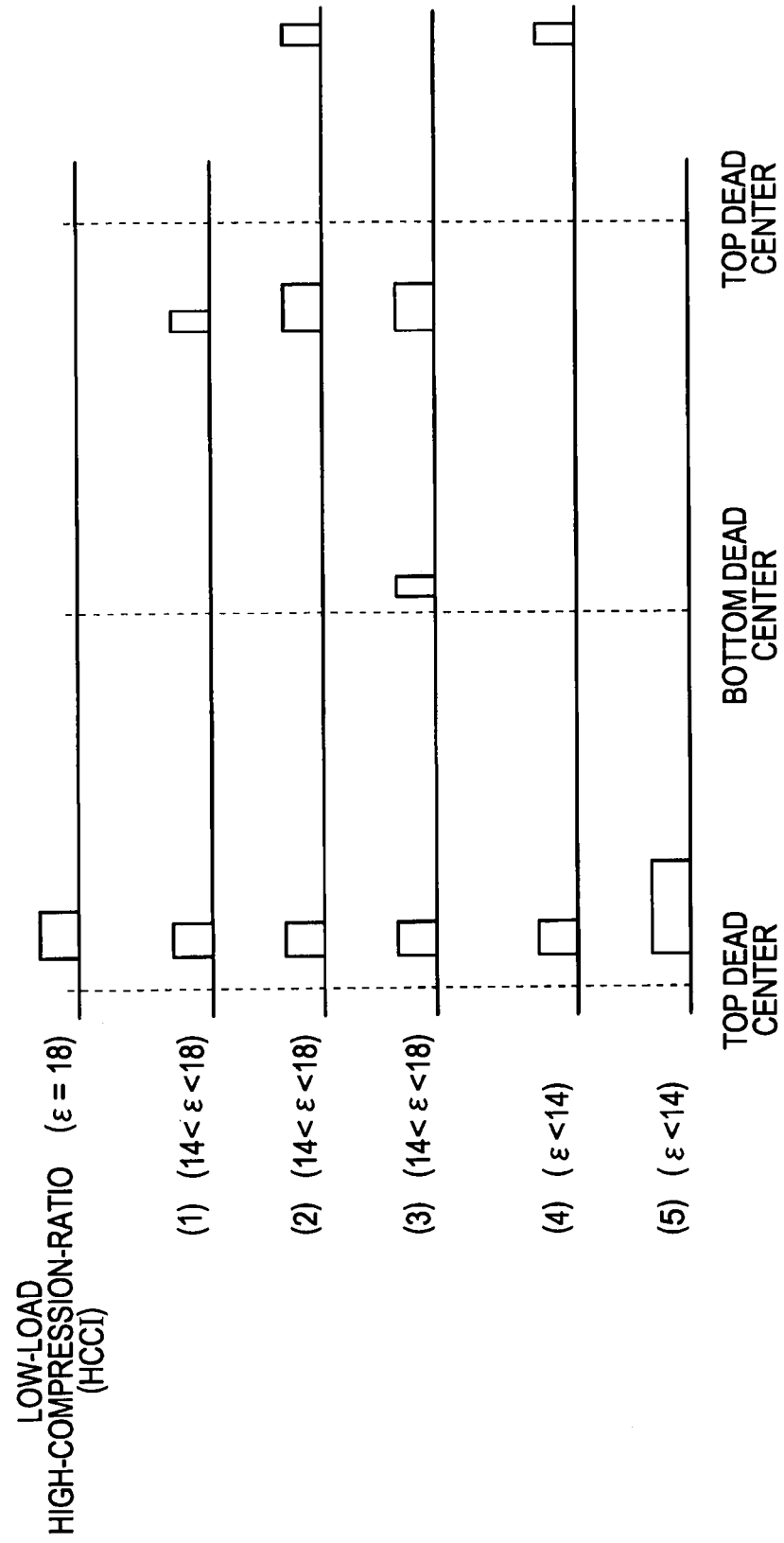

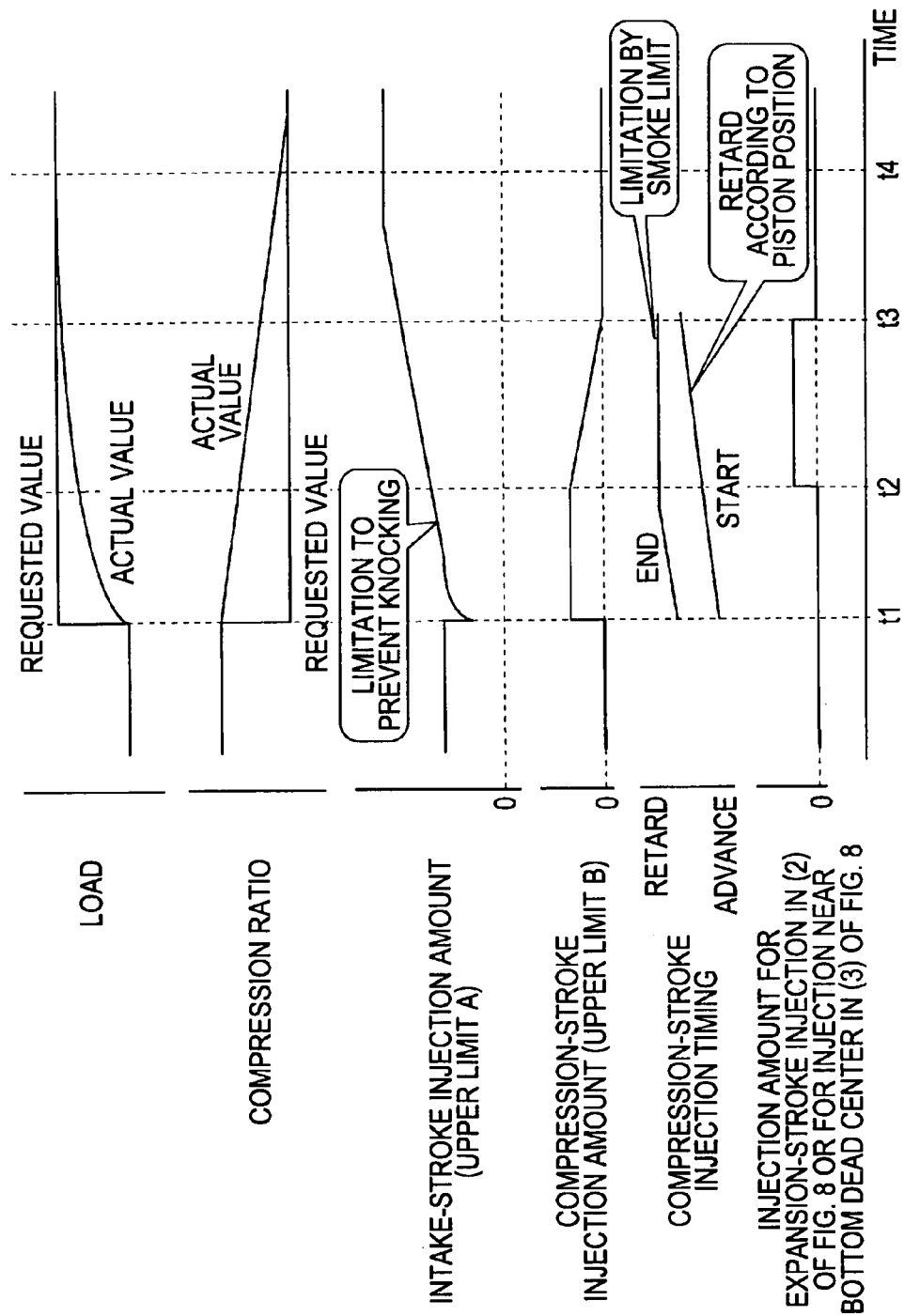

CONTROL APPARATUS FOR A CYLINDER DIRECT-INJECTION INTERNAL COMBUSTION ENGINE

CROSS-REFERENCE TO RELATED APPLICATIONS

This application claims priority to Japanese Patent Application No. 2008-052342 filed Mar. 3, 2008, and Japanese Application No. 2009-012699 filed Jan. 23, 2009, each of which is incorporated by reference herein in its entirety.

BACKGROUND OF THE INVENTION

1. Field of the Invention

The present invention relates to fuel injection control of internal combustion engines, and particularly, to a control apparatus for a four stroke cylinder direct-injection internal combustion engine that injects fuel directly into a cylinder.

2. Description of the Related Art

Japanese Unexamined Patent Application Publication No. 10-231744 discloses a configuration for controlling a fuel-injection amount and a fuel-injection timing in a so-called cylinder direct-injection internal combustion engine that injects fuel directly into a cylinder. Specifically, in this configuration, stratified combustion is performed by injecting fuel during the compression stroke when the engine is operating in a specific operating range of, for example, medium/high load. When performing stratified combustion, a fuel injection is performed during the intake stroke prior to the injection in the compression stroke. Specifically, the injection is performed such that the fuel injected during the intake stroke is prevented from pre-igniting and that a total air-fuel ratio determined from the total amount of fuel injected in the compression stroke and the intake stroke is made close to a stoichiometric air-fuel ratio. In Japanese Unexamined Patent Application Publication No. 10-231744, the stratified combustion is performed by injecting fuel towards a cavity provided at the top surface of a piston reciprocating in the cylinder.

An internal combustion engine that can vary the engine compression ratio by changing the position of the top dead center of the piston is known. For example, when the known internal combustion engine is running at high load, the compression ratio is reduced to a low value so as to prevent abnormal combustion, such as knocking. In such a variable compression ratio internal combustion engine, supposing that the reduction in the compression ratio is delayed during a transient state in which the engine compression ratio is varied, the occurrence of knocking can be prevented during the transient state by performing the fuel-injection control discussed in Japanese Unexamined Patent Application Publication No. 10-231744.

SUMMARY OF THE INVENTION

An object of the present invention is to minimize deterioration of exhaust performance and combustion performance that may occur in a variable compression ratio internal combustion engine of a cylinder direct-injection type as a result of a change in the positional relationship between the injected fuel and the piston during a transient operation period when the engine load changes.

In one embodiment of the invention, a control apparatus is provided for a four stroke cylinder direct-injection internal combustion engine having a cylinder and a piston disposed within the cylinder. The control apparatus includes a variable compression ratio mechanism for variably controlling the engine compression ratio by changing the top dead center position of the piston, a fuel injection device for injecting fuel directly into the cylinder, and a controller for controlling the fuel injection device and the variable compression ratio mechanism. When the actual compression ratio of the internal combustion engine is higher than a target compression ratio, the controller causes the variable compression ratio mechanism to reduce the compression ratio. Further, in accordance with the reduction in the compression ratio the controller controls the fuel injecting device to inject an intake fuel injection amount in the intake stroke and a compression fuel injection amount in the compression stroke, and retards the timing for starting the fuel injection in the compression stroke.

In another embodiment of the invention, a method is provided for controlling fuel injection in a four stroke cylinder direct-injection internal combustion engine having a cylinder and a piston disposed within the cylinder. The method includes reducing the compression ratio when the actual compression ratio of the internal combustion engine is higher than a target compression ratio, and in accordance with the reduction in the compression ratio, injecting an intake fuel injection amount in the intake stroke and a compression fuel injection amount in the compression stroke, and retarding the timing for starting the fuel injection in the compression stroke.

In another embodiment of the invention, a control apparatus for a four stroke cylinder direct-injection internal combustion engine having a cylinder and a piston disposed within the cylinder is provided. The control apparatus includes variable compression ratio means for variably controlling the engine compression ratio by changing the top dead center position of the piston, fuel injection means for injecting fuel directly into the cylinder, and control means for controlling the fuel injection means and the variable compression ratio means. When the actual compression ratio of the internal combustion engine is higher than a target compression ratio, the variable compression ratio means reduces the compression ratio. Further, in accordance with the reduction in the compression ratio the fuel injecting means injects an intake fuel injection amount in the intake stroke and a compression fuel injection amount in the compression stroke, and the control means retards the timing for starting the fuel injection in the compression stroke.

Thus, according to the present invention, the timing for starting the compression-stroke injection is controlled according to the actual compression ratio, whereby deterioration of exhaust performance and combustion performance that may occur as a result of a change in the positional relationship between the injected fuel and the piston can be minimized even during a transient state when the compression ratio is varied.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIGS. 1A and 1B are front views of an engine to which a first embodiment of the present invention is applied, and FIG. 1C is a top view of a piston;

FIGS. 3A and 3B illustrate an operation of the variable compression ratio mechanism, in which FIG. 3A shows a state where the mechanism is set in a position corresponding to a high compression ratio and FIG. 3B shows a state where the mechanism is set in a position corresponding to a low compression ratio;

FIG. 8 is a diagram that summarizes the fuel injection modes in respective operating conditions;

FIG. 9 is a timing chart showing fuel injection timings;

FIG. 10 is a timing chart showing fuel injection amount during the transient period when the engine load increases;

DESCRIPTION OF THE PREFERRED EMBODIMENTS

Figure 2:
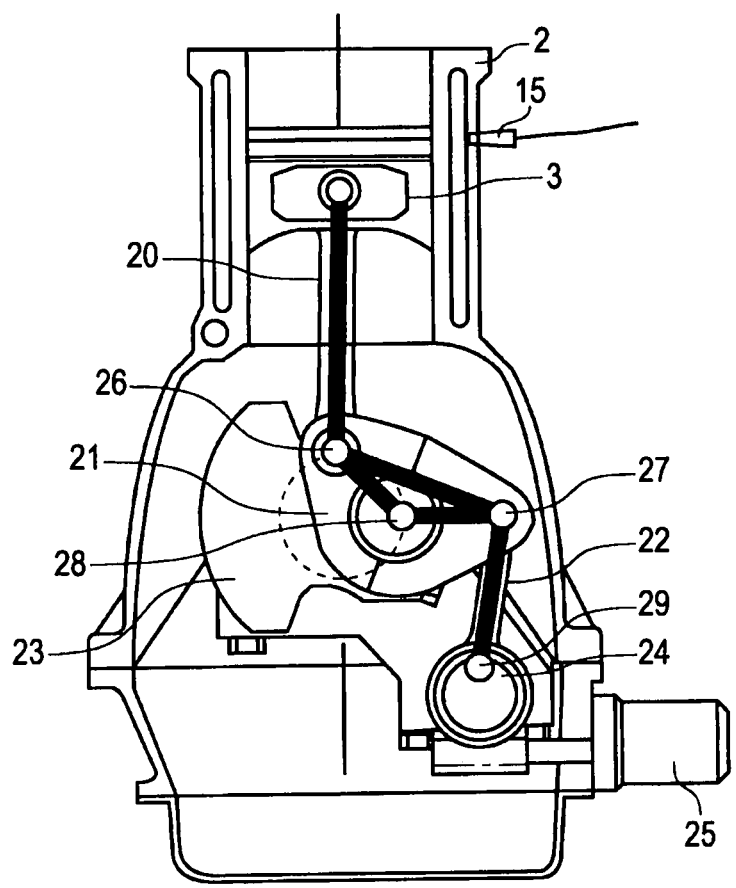
FIG. 2 illustrates an example of a variable compression ratio mechanism.

Embodiments of the present invention will be described in detail below with reference to the accompanying drawings.

First Embodiment

FIGS. 1A to 1C illustrate a system configuration according to a first embodiment of the present invention. Specifically, FIG. 1A is a cross-sectional view of one of cylinders of an engine and its surrounding area, as viewed from the front of the engine. FIG. 1B is also a cross-sectional view as viewed from one side of the engine. FIG. 1C illustrates a top surface of a piston as viewed from above the engine.

The engine is, for example, a four stroke engine, each cylinder having an intake stroke, which air is drawn into the cylinder as the piston moves to expand volume in the cylinder while intake valve(s) are open, a compression stroke, in which air is compressed in the cylinder as the piston moves to decrease the volume in the cylinder while intake and exhaust valves are closed, an expansion stroke or power stroke, during which a fuel-air mixture is combusted to force the piston to move to expand the volume in the cylinder while the intake and exhaust valves are closed, and an exhaust stroke, in which combustion products are forced out of the cylinder as the piston moves to decrease the volume in the cylinder while the exhaust valve(s) are open. When the piston is exactly between the intake stroke and the compression stroke, or exactly between the expansion stroke and the exhaust stroke, the position of the piston is termed "bottom dead center" because the piston is at the bottom of the cylinder and a connecting rod connecting the piston to a crankshaft of the engine is centered on the piston. When the piston is exactly between the compression stroke and the expansion stroke, or exactly between the exhaust stroke and the intake stroke, the position of the piston is termed "top dead center" because the piston is at the top of the cylinder and the connecting rod connecting the piston to the crankshaft of the engine is centered on the piston. Thus, at bottom dead center, the volume in the cylinder above the piston is at a maximum, and at top dead center, the volume in the cylinder above the piston is at a minimum, and the ratio of the maximum volume to the minimum volume is termed the "compression ratio" of the cylinder. The compression ratio is designated as "$\epsilon$" in the figures. Although the terminology "top" and "bottom" are used to indicate the relative location of the piston within the cylinder, those terms do not necessarily convey the absolute vertical position of the piston as it reciprocates within the cylinder. Timing of fuel injection or ignition is typically described in crank angles (i.e., degrees of rotation of the engine crankshaft) relative to the top dead center position of the piston between the compression and expansion strokes, with the term "advanced" meaning a timing at an earlier crank angle and the term "retarded" meaning a timing at a later crank angle.

Each cylinder 100 is formed by a cylinder head 1, a cylinder block 2, a piston 3 disposed in the cylinder block 2 in a slidable manner so that the piston 3 can reciprocate within the cylinder 100. A combustion chamber 4 is formed by an undersurface of the cylinder head 1, the cylinder block 2, and a top surface of the piston 3. The cylinder 100 includes intake passages 5, exhaust passages 6, intake valves 7, exhaust valves 8, a spark plug 9, a fuel injection device (valve) 10, an intake camshaft 11, a throttle valve 12, an exhaust camshaft 13, a control unit 14 serving as fuel injection controlling means, a knocking sensor 15, and an ignition coil 16.

The intake passages 5 and the exhaust passages 6 each have an opening so as to communicate with the combustion chamber 4. Each intake valve 7 is configured to open and close to enable intake air to flow from the corresponding intake passage 5 into the cylinder 100, and each exhaust valve 8 is configured to open and close to allow exhaust to flow from the cylinder into the corresponding exhaust passage 6. The intake valves 7 and the exhaust valves 8 are respectively driven by the intake camshaft 11 and the exhaust camshaft 13.

This embodiment employs dual intake valves 7 and dual exhaust valves 8 for each cylinder 100 in which each cylinder 100 is equipped with two intake valves 7 and two exhaust valves 8 as well as two intake channels 5 and two exhaust passages 6. Specifically, a passage having an opening in one side surface of the cylinder head 1 bifurcates inside the cylinder head 1 so as to form the two intake passages 5. On the other hand, the two exhaust passages 6 join into one passage inside the cylinder head 1, and the joined channel has one opening in the other side surface of the cylinder head 1.

The spark plug 9 and the fuel injection valve 10 are both disposed so as to face the central area in the top of the combustion chamber 4. The control unit 14 controls, for example, the fuel injection timing (i.e., the start time and duration each time fuel is injected into the cylinder 100), the fuel injection amount (i.e., the amount of fuel injected by the fuel injection valve 10 on each injection), and the injection pressure of the fuel injection valve 10, and also calculates the ignition timing of the spark plug 9 so as to control power supplied to the ignition coil 16 on the basis of the calculated ignition timing.

The throttle valve 12 is rotatably attached to a shaft that extends crosswise through the intake passages 5, and is driven by, for example, an actuator motor, in response to a signal from the control unit 14.

The knocking sensor 15 is configured to detect vibration inside the combustion chamber 4 and is, for example, a piezoelectric sensor. A detection signal from the knocking sensor 15 is input to the control unit 14 which determines whether or not knocking is occurring on the basis of the frequency of the vibration in the detection signal.

The top surface of the piston 3 is provided with a cavity 17. The cavity 17 has a substantially circular periphery and is disposed at a position that is offset from the center of the top surface of the piston 3.

In addition to the detection signal from the knocking sensor 15, the control unit 14 also receives detection signals from a crank angle sensor, an accelerator opening degree sensor, an air flow meter (not shown), and other electronic equipment monitoring the operating condition of the engine.

FIG. 2 illustrates an example of a variable compression ratio mechanism used in this embodiment. Examples of the variable compression ratio mechanism are discussed in Japanese Unexamined Patent Application Publication Nos. 2001-227367 and 2002-61501. A schematic configuration of the mechanism will be described below.

In this mechanism, the piston 3 is linked with a crankshaft 23 by means of a first link 20 and a second link 21. The first link 20 and the second link 21 are linked to each other by means of a linking pin 26. The second link 21 has its center rotatably joined to a crankpin 28 of the crankshaft 23 so as to rotate together with the crankshaft 23. A side of the second link 21 that is distant from the first link 20 has a third link 22 rotatably joined thereto by means of a linking pin 27. The third link 22 is secured to a control shaft 24 by means of a linking pin 29. The axis of the secured section of the third link 22 is eccentric to the central axis of the control shaft 24. As the control shaft 24 rotates, the linking pin 29 moves so as to change the tilt angle of the second link 21, thereby changing the position of the first link 20 as well as the position of top dead center of the piston 3 within the cylinder 100. The control shaft 24 is rotated by a motor actuator 25.

The position of top dead center of the piston 3 within the cylinder 100 is changed by the rotation of the control shaft 24, as be described with reference to FIGS. 3A and 3B. FIGS. 3A and 3B schematically illustrate the positional relationship between the links 20, 21, and 22, the linking pins 26, 27, 28, and 29, and the control shaft 24. Specifically, FIG. 3A illustrates a state where top dead center of the piston 3 is set at a high position, that is, a position corresponding to a high compression ratio. FIG. 3B illustrates a state where the top dead center of the piston 3 is set at a low position, that is, a position corresponding to a low compression ratio.

As shown in FIG. 3A, when the control shaft 24 is rotated such that the linking pin 29 moves toward a position that is lower than the central axis of the control shaft 24 (i.e., the horizontal axis of the control shaft 24 as depicted), the linking pin 27 is lowered, thus causing the second link 21 to tilt to a steeper angle about the crankpin 28. The steeper tilting of the second link 21 shifts the linking pin 26 upward, thereby shifting the top dead center position of the piston 3 upward and increasing the compression ratio.

In contrast, as shown in FIG. 3B, when the control shaft 24 is rotated such that the linking pin 29 moves toward a position that is higher than the central axis of the control shaft 24 (i.e., the horizontal axis of the control shaft 24 as depicted), the linking pin 27 is raised, thus causing the second link 21 to tilt to a shallower angle about the crankpin 28. The shallower tilting of the second link 21 shifts the linking pin 26 downward, thereby shifting the top dead center position of the piston 3 downward and reducing the compression ratio.

Figure 4:
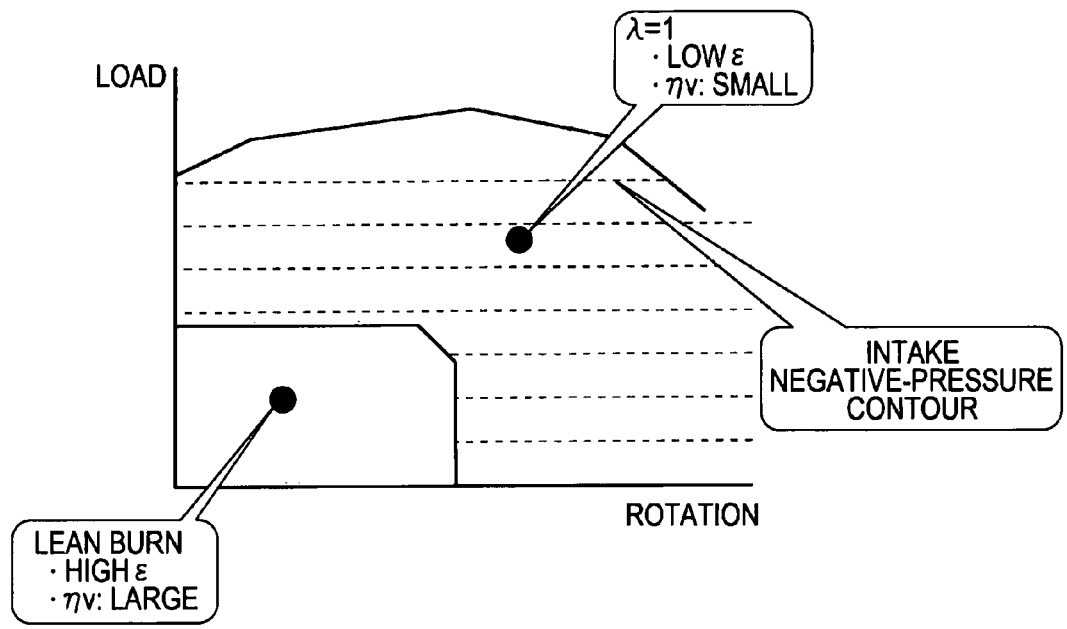
FIG. 4 is an operating range map showing combustion methods for respective operating ranges in a first embodiment of the invention.
Figure 5:
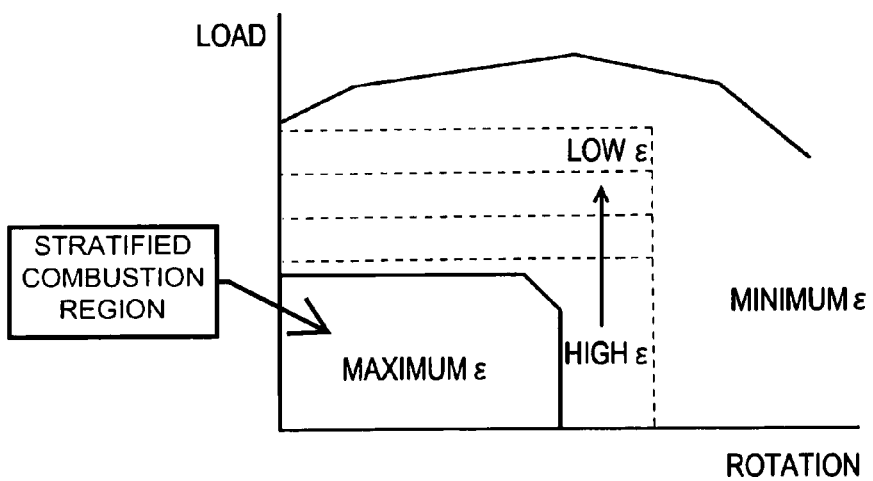
FIG. 5 is an operating range map showing engine compression ratios in the respective operating ranges in a first embodiment of the invention.

FIG. 4 illustrates combustion methods used in respective operating ranges of an engine having the above-described configuration. FIG. 5 illustrates engine compression ratios in the respective operating ranges of such an engine. The process of the present invention minimizes deterioration of exhaust performance and combustion performance that may occur in a variable compression ratio internal combustion engine of a cylinder direct-injection type as a result of a change in the positional relationship between the injected fuel and the piston during a transient operation period when the engine load changes. In other words, when a requested load of the engine changes, the compression ratio of the engine is changed by moving the position of the piston in the cylinder, which may negatively impact the combustion and exhaust performance of the engine during the transient period when the combustion ratio is being changed. The present invention addresses this problem.

In the following description, the terms "stoichiometric," "lean," and "rich" are used to denote the relative proportion of air and fuel provided to the cylinder. A stoichiometric air-fuel ratio is understood to be a ratio of air to fuel such that there is sufficient oxygen in the air to fully combust substantially all of the hydrogen and carbon in the fuel so that the exhaust contains primarily combustion products (i.e., water vapor and carbon dioxide) and nitrogen, along with small amounts of partially burned combustion products and pollutants (e.g., carbon monoxide, nitrogen oxides, sulfur oxides, etc.), but does not contain substantial amounts of excess unburned fuel or excess oxygen. A lean air-fuel ratio or lean combustion denotes a situation in which there is excess oxygen as compared with a stoichiometric air-fuel ratio, and a rich air-fuel ratio or rich combustion denotes a situation in which there is insufficient oxygen for complete combustion as compared with a stoichiometric air-fuel ratio.

In a low-rotation low-load range of operation of the engine, fuel is injected towards the cavity 17 of the piston 3 during the compression stroke with an air-fuel ratio set leaner (i.e., less fuel) than a stoichiometric air-fuel ratio. The fuel injection creates a stratified mixture, such that by spark-igniting the stratified mixture, stratified combustion is performed. In this case, the engine compression ratio is set to a maximum compression ratio (of, for example, about 18), and a large volume of exhaust gas recirculation (EGR) gas is introduced. This allows for satisfactory fuel consumption performance as well as combustion with low nitrogen oxides (NOx) emissions. In addition, introduction of a large volume of air nearly equivalent to that during a full-throttle operation allows for reduced pumping loss.

Alternatively, a fuel injection may be performed during the intake stroke, and a compression self-ignition operation using a high compression ratio may be performed without spark ignition by the spark plug 9.

On the other hand, in a high-load high-rotation range of operation of the engine, stoichiometric combustion is performed by spark igniting a mixture having a generally homogeneous stoichiometric air-fuel ratio throughout the entire combustion chamber 4, so as to control the load based on the amount of air. In this range, the engine compression ratio is made to decrease with increasing engine load in order to avoid abnormal combustion, such as pre-ignition or knocking. In an operating range wherein the engine rotation speed is greater than or equal to a predetermined rotation speed and/or the load is greater than or equal to a predetermined load, the compression ratio is set to a minimum compression ratio.

When the engine is running in the stratified combustion range depicted in FIG. 5, a response delay of the variable compression ratio mechanism (e.g., a response delay of the motor actuator 25) may occur when the driver demands acceleration and the engine load increases accordingly, which can cause a condition where the compression ratio is not sufficiently reduced to accommodate the increasing demanded load. In such a condition, abnormal combustion, such as knocking, may occur. To prevent abnormal combustion in this circumstance, a fuel injection is performed during the compression stroke to produce stratified combustion, and when performing stratified combustion, a fuel injection is also performed during the intake stroke prior to the injection in the compression stroke. The fuel injection amount in the intake stroke is limited to an amount of fuel that prevents the injected fuel from self-igniting before the ignition timing of the spark plug, namely, an amount of fuel that prevents the occurrence of pre-ignition (a pre-ignition intake fuel injection amount). The total amount of fuel injected during the compression stroke and the intake stroke is set to an amount of fuel that allows the total air-fuel ratio in the entire combustion chamber to be close to the stoichiometric air-fuel ratio. (Note the total amount also includes an amount of fuel to be additionally injected if an additional injection is performed as described below.)

When a lean air-fuel ratio produced by providing a large amount of air is to be switched to a stoichiometric air-fuel ratio by limiting the amount of air, the amount of air sometimes cannot be limited sufficiently quickly due to a response delay of the throttle valve 12 or a delay caused by the behavior of the air itself. In that case, when the fuel-injection amount is set on the basis of the amount of air, since the actual amount of air is large relative to the requested load, the fuel-injection amount also becomes excessive, thus resulting in an excessive output which gives a feeling of discomfort to the driver. On the other hand, when the fuel-injection amount is set according to the requested load, the actual amount of air is greater than the amount of air suitable for the requested load, thus resulting in a lean air-fuel ratio, which can disadvantageously increase the amount of NOx emissions. Therefore, the fuel-injection amount in the present embodiment is set using the following method.

Figure 6B:
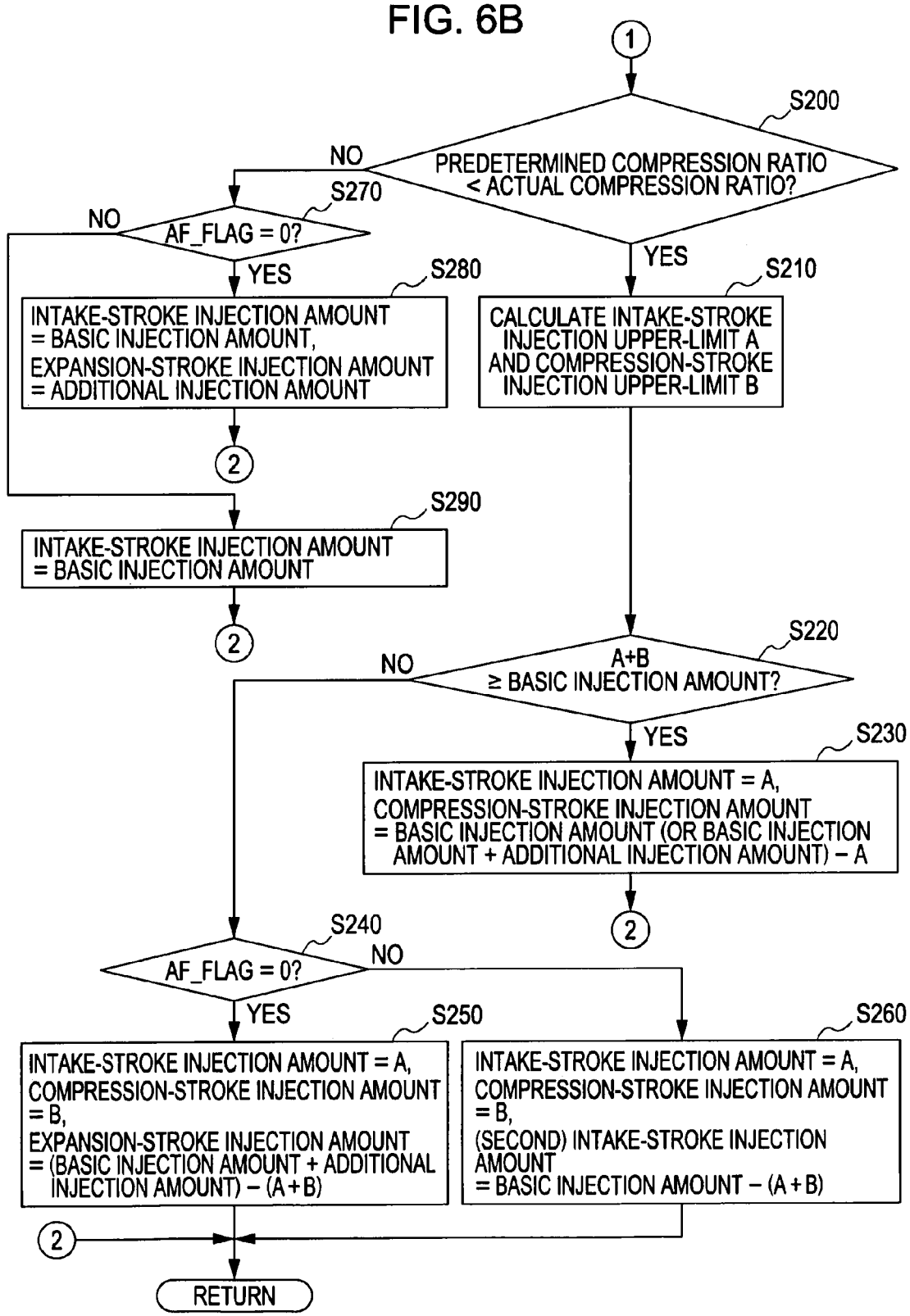
FIG. 6, including FIGS. 6A and 6B spanning two pages, is a flow chart showing a control routine for fuel injection control performed during a transient period when an engine load increases.

FIG. 6 is a flow chart showing a control routine of fuel injection control performed by the control unit 14 when switching from the lean air-fuel ratio range to the stoichiometric air-fuel ratio range shown in FIG. 4. The control routine will be described below in a step-by-step manner.

In step S100, it is determined where or not there is a request for an increase in the engine load. If there is a request, the process proceeds to step S110. If there is no request, the operation repeats the start. The determination step S110 is performed by detecting whether there is a change in a sensor signal, for example, a sensor measuring the engine speed or the degree of opening of the accelerator pedal. If a requested load calculated on the basis of the sensor signal is outside the lean air-fuel ratio range shown in FIG. 4, it is determined that there is a request for an increase in the engine load.

In step S110, a target compression ratio is retrieving from the map shown in FIG. 5 on the basis of the engine speed and a target engine load calculated from, for example, the degree of opening of the accelerator pedal. The process proceeds to step S120.

In step S120, the actual compression ratio of the engine is detected according to an operating amount of the motor actuator 25. Specifically, because the motor actuator 25 operates on the basis of a signal from the control unit 14, an actual compression ratio can be detected on the basis of the operating amount of the motor actuator 25. Alternatively, the actual compression ratio can be detected by providing a cylinder-pressure sensor. The process proceeds to step S130.

Figure 7:
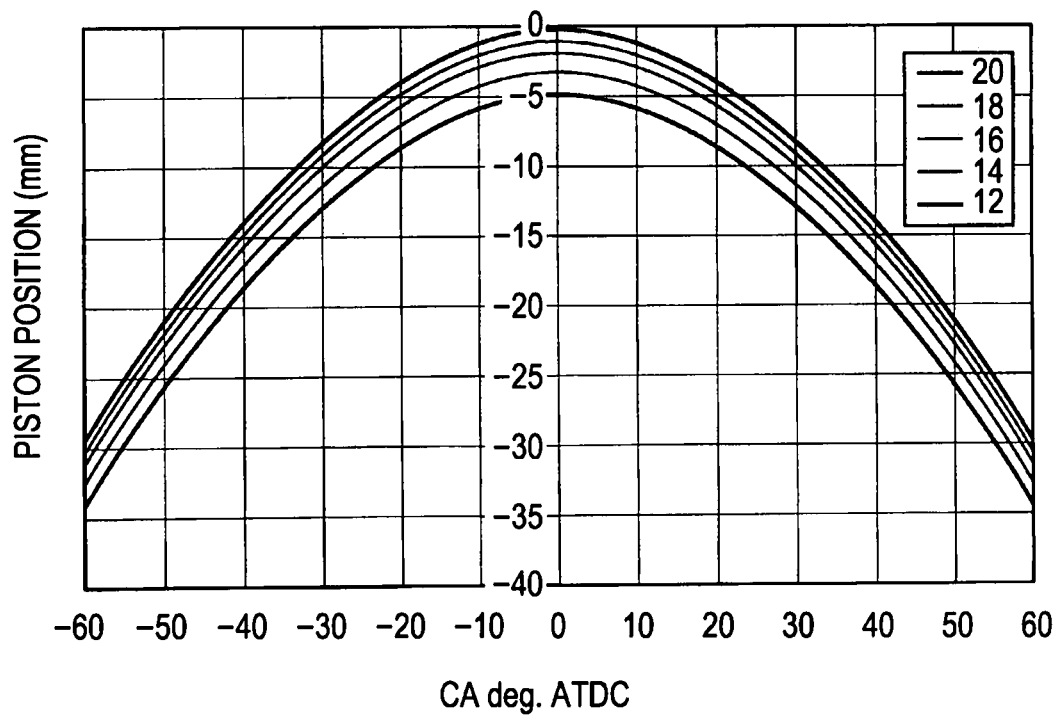
FIG. 7 is a graph showing piston positions at respective compression ratios.

In step S130, a timing is set for starting a fuel injection to be performed during the compression stroke. FIG. 7 is a graph showing the piston behavior according to several engine compression ratios in the above-described variable compression ratio mechanism. The ordinate of this graph indicates the piston position, whereas the abscissa indicates the crank angle. As shown in FIG. 7, when at the same crank angle, the piston position becomes higher with increasing engine compression ratio.

Therefore, an optimal timing for starting a compression-stroke injection varies according to the different engine compression ratios. If the injection starting timing is to be set as a timing that corresponds to the crank angle at each target compression ratio, the positional relationship between the injected fuel and the piston may change. This can cause, for example, the injected fuel to impact against the top surface of the piston so as to bounce back and splatter on the wall of the cylinder bore, or the injected fuel to overflow from the cavity of the piston. Such being the case, a piston position is calculated from the engine compression ratio so as to set the injection starting timing in accordance with this piston position. An optimal injection starting timing is retarded with decreasing engine compression ratio.

In step S140, an amount of intake air is predicted. It is understood that in a multi-cylinder engine, the cylinders operate in a fixed sequence or "firing order," such each cylinder may be in a different phase of the four stroke operation at any given time. Accordingly, the amount of intake air predicted for the present cylinder can be closely estimated by detecting the intake air flow (e.g., via an air flow meter) taken into the cylinder immediately prior to the present cylinder in the firing order, that is, the amount of air taken into the previous cylinder when viewed in the order in which ignition is performed on the cylinders. The detected amount of air taken into the previous cylinder is used as the predicted amount of air to be taken into the present cylinder. However, the present cylinder differs from the previous cylinder in terms of the position of the bottom dead center of the piston since the present cylinder is in the course of undergoing variable compression ratio control. For this reason, the cylinder capacity at the bottom dead center is different between the two cylinders. Therefore, the amount of intake air is corrected based on the difference in the cylinder capacities at the bottom dead centers of the two cylinders.

Although it is desirable to use the amount of air taken into the previous cylinder, as mentioned above, it is also possible to use the amount of air taken into a cylinder even before the previous cylinder, based on the firing order in which ignition is performed on the cylinders. As another alternative, a variation in the amount of intake air may be sequentially calculated so that, on the basis of this variation, an amount of air to be taken into the present cylinder can be calculated, or can be predicted on the basis of the pressure in the intake passages and the timing for closing the intake valves. The process proceeds to step S150.

In step S150, a required fuel injection amount for generating the requested load is calculated. The process proceeds to step S160.

In step S160, an air-fuel ratio ("A/F ratio") is calculated from the amount of intake air estimated in step S140 and the fuel-injection amount calculated in step S150. The process proceeds to step S170. In step S170, it is determined whether or not the calculated air-fuel ratio is leaner than the stoichiometric air-fuel ratio.

If the calculated air-fuel ratio is determined to be lean, the operation proceeds to step S180 where the required fuel-injection amount for generating the requested load (calculated in step S150) is set as a basic injection amount for the engine load. In addition, an injection amount to make up the deficiency in the calculated injection amount with respect to producing a stoichiometric air-fuel ratio is set as an additional injection amount. The additional injection amount is the injection amount required to make the air-fuel ratio equal to the stoichiometric air-fuel ratio when the air-fuel ratio based on the calculated basic injection amount is lean. Also, an AF flag is set to zero (AF_FLAG=0). In this case, the total of the basic injection amount and the additional injection amount can be considered as a target fuel injection amount equivalent to a total amount of fuel to be supplied in each cycle.

If the calculated air-fuel ratio is determined not to be lean, the operation proceeds to step S190 where the injection amount for producing the stoichiometric air-fuel ratio is set as a basic injection amount, and the AF flag is set to one (AF_FLAG=1). In particular, when the calculated air-fuel ratio is richer than the stoichiometric air-fuel ratio, the injection amount is limited to the injection amount for producing the stoichiometric air-fuel ratio regardless of the required fuel-injection amount for generating the requested load (calculated in step S150), and the stoichiometric injection amount is set as a basic injection amount for the engine load. This can minimize the emission of unburned hydrocarbon caused by fuel-rich combustion. If the calculated air-fuel ratio is equal to the stoichiometric air-fuel ratio, the injection amount calculated in step S150 is directly set as a basic injection amount for the engine load. In either case, the basic injection amount can be considered as a target fuel injection amount equivalent to a total amount of fuel to be supplied in each cycle. The process proceeds to step S200.

In step S200, it is determined whether or not the actual compression ratio is higher than a predetermined compression ratio. The predetermined compression ratio used here is a lower limit of a compression ratio at which an operation delay of the variable compression ratio mechanism may cause abnormal combustion, such as knocking or pre-ignition, when, for example, variable compression-ratio control is being performed in response to a request for an increase in the load during a low-load operation. For example, in an engine in which the maximum compression ratio is 18 and the minimum compression ratio is 12, the predetermined compression ratio is set to a value of about 14. Based on the determination result in step S200, if the actual compression ratio is lower than the predetermined compression ratio, the operation proceeds to step S270, whereas if the actual compression ratio is higher than the predetermined compression ratio, the operation proceeds to step S210.

In step S210, an upper limit of an amount of fuel injected during the intake stroke (intake stroke injection upper limit amount A) and an upper limit of an amount of fuel injected during the compression stroke (compression stroke injection upper limit amount B) are calculated. The intake stroke injection upper limit amount A is an injection amount that can prevent a fuel mixture created by the injection from pre-igniting. This injection amount is set according to the engine compression ratio, and, for example, increases with decreasing engine compression ratio. The compression stroke injection upper limit amount B is an injection amount that is injectable between the timing for starting the compression stroke injection set in step S130 and a predetermined timing for ending the injection. The compression stroke injection upper limit amount B varies according to the actual engine compression ratio. The predetermined timing for ending the injection is set to, for example, a threshold time point (corresponding to a smoke limit) at which smoke can still be prevented from being produced and emitted from the exhaust due to incomplete combustion. The process proceeds to step S220.

In step S220, it is determined whether or not the sum of the intake stroke injection upper limit amount A and the compression stroke injection upper limit amount B is greater than or equal to the basic injection amount, that is, whether or not the total fuel-injection amount of the intake stroke injection upper limit amount A and the compression stroke injection upper limit amount B reaches the basic injection amount for the engine load. If the total fuel injection amount is greater than or equal to the basic injection amount, the operation proceeds to step S230, whereas if the total fuel-injection amount is smaller than the basic injection amount, the operation proceeds to step S240.

In step S230, because the total fuel injection amount of the intake stroke injection upper limit amount A and the compression stroke injection upper limit amount B is greater than or equal to the basic injection amount for the engine load, the intake stroke injection upper limit amount A is set as an intake stroke injection amount, and an amount obtained by subtracting the intake stroke injection upper limit amount A from the basic injection amount or from the total of the basic injection amount and an additional injection amount (if an additional injection amount has been determined), is set as a compression stroke injection amount. When there is an additional injection amount to compensate for a deficiency in the injection amount for producing the stoichiometric air-fuel ratio (AF_FLAG=0) and the total fuel injection amount of the intake stroke injection amount and the compression stroke injection amount is greater than or equal to the basic injection amount for the engine load, it is understood that the engine is in a transient state will not necessarily continue for a long time. Accordingly, the total injection amount of the basic injection amount and the additional injection amount is injected during the intake stroke and the compression stroke. For example, to control exhaust emissions during acceleration, there is a large amount of air at the initial stage of the acceleration (which slows down the acceleration) despite that there is only a small amount of fuel for the requested load, so additional fuel is sometimes necessary for resolving the lean state. However, in such a case, since the vehicle is to be accelerated moderately to begin with, the compression ratio is not to be significantly changed, and the transient state is expected to pass immediately. Consequently, an increase in torque occurring as a result of injecting the additional fuel prior to ignition can be considered to be within a negligible range, and this embodiment allows for simplification by injecting the entire fuel during the intake stroke and the compression stroke before combustion.

If the total fuel injection amount of the intake stroke injection upper limit amount A and the compression stroke injection upper limit amount B is lower than the basic injection amount for the engine load, the operation proceeds to step S240 where it is determined whether or not AF_FLAG=0. If AF_FLAG=0, the operation proceeds to step S250, whereas if AF_FLAG=1, the operation proceeds to step S260.

In step S250, the intake stroke injection upper limit amount A is set as an intake stroke injection amount and the compression stroke injection upper limit amount B is set as a compression stroke injection amount. Moreover, an amount obtained by subtracting the sum of the intake stroke injection upper limit amount A and the compression stroke injection upper limit amount B from the total of the basic injection amount and the additional injection amount is set as an expansion stroke injection amount. In this case, the requested acceleration is to an extent that it requires an additional amount of fuel to compensate for the deficiency in the injection amount for producing the stoichiometric air-fuel ratio, and the requested load is considered to be not very high. Thus, the remaining amount of fuel in the basic injection amount is entirely injected together as the additional injection amount during the expansion stroke after the combustion, thereby allowing for simplified control.

In step S260, the intake stroke injection upper limit amount A is set as an intake stroke injection amount and the compression stroke injection upper limit amount B is set as a compression stroke injection amount, and an amount obtained by subtracting the sum of the intake stroke injection upper limit amount A and the compression stroke injection upper limit amount B from the basic injection amount is set as a second intake stroke injection amount. In this case, a second intake stroke injection is performed relatively immediately after intake bottom dead center (e.g., a range between the bottom dead center and 45° after the bottom dead center, or a range between 45° before the bottom dead center and 45° after the bottom dead center) as shown in FIG. 9 to be described below. Specifically, when based on the piston position, the second intake stroke injection is performed at an initial stage of the compression stroke. However, because the timing for closing the intake valves is normally set to a time point after the bottom dead center in view of, for example, an intake inertia effect, the term "second intake-stroke injection" will be used here.

On the other hand, if it is determined in step S200 that the actual compression ratio is lower than the predetermined compression ratio, the operation proceeds to step S270 where it is determined whether or not AF_FLAG=0. If AF_FLAG=0, the operation proceeds to step S280, whereas if AF_FLAG=1, the operation proceeds to step S290.

In step S280, the basic injection amount is set as an intake stroke injection amount and the additional injection amount is set as an expansion stroke injection amount. An expansion stroke injection is performed at a retarded timing in the expansion stroke (e.g., at 90° or later after the top dead center), and the injection start timing of the expansion stroke injection is set such that the additional fuel is completely injected during the expansion stroke. In step S290, the basic injection amount is set as an intake stroke injection amount.

After any of the steps S250, S260, S280, or S290 is completed, the process returns to the start.

FIG. 8 is a diagram that summarizes the above-described control, namely, fuel injection control performed during a transient period in which the engine compression ratio is reduced in response to a request for an increase in the engine load. FIG. 9 is an injection timing chart for the fuel injection control. The injection timing at the time of a low-load high-compression-ratio operation shown in FIG. 9 (i.e., the top line in the figure) corresponds to when a compression self-ignition operation is performed.

When the actual compression ratio is higher than the predetermined compression ratio, as long as the sum of the intake stroke injection upper limit amount A and the compression stroke injection upper limit amount B is higher than or equal to the basic injection amount, the intake stroke injection and the compression stroke injection are performed whether the air-fuel ratio between the amount of intake air and the fuel injection amount for the requested load is leaner than, richer than, or equal to the stoichiometric air-fuel ratio (step S230 in FIG. 6 and (1) in FIGS. 8 and 9). In this case, the air-fuel ratio is the stoichiometric air-fuel ratio.

When the actual compression ratio is higher than the predetermined compression ratio and the sum of the intake stroke injection upper limit amount A and the compression stroke injection upper limit amount B is smaller than the basic injection amount, if the air-fuel ratio between the amount of intake air and the fuel injection amount for the requested load is lean, the basic injection amount is injected during the intake stroke and the compression-stroke, and moreover, the additional injection amount is injected during the expansion stroke (step S250 in FIG. 6 and (2) in FIGS. 8 and 9). Specifically, if it is determined that the fuel injection amount is sufficient for the requested load and the air-fuel ratio is lean, fuel is additionally injected at a retarded timing the expansion stroke so that the air-fuel ratio is made equal to the stoichiometric air-fuel ratio. In consequence, the exhaust gas can be given the stoichiometric air-fuel ratio without affecting the engine load. In other words, the quality of exhaust emission can be prevented from being reduced while ensuring the load requested by the driver. Under the same condition, if the air-fuel ratio between the amount of intake air and the fuel injection amount for the requested load is richer than or equal to the stoichiometric air-fuel ratio, the injection is performed twice during the intake stroke, and another injection is performed during the compression stroke (step S260 in FIG. 6 and (3) in FIGS. 8 and 9). Specifically, if the sum of the intake stroke injection upper limit amount A and the compression stroke injection upper limit amount B is short of the fuel injection amount for the requested load by a certain amount, the second intake stroke injection is performed near the bottom dead center in the intake stroke so as to compensate for the certain deficient amount.

When the actual compression ratio is lower than the predetermined compression ratio, if the air-fuel ratio between the amount of intake air and the fuel injection amount for the requested load is lean, the basic injection amount is injected during the intake stroke and the additional injection amount is injected during the expansion stroke. Thus, the air-fuel ratio of the exhaust gas is made equal to the stoichiometric air-fuel ratio (step S280 in FIG. 6 and (4) in FIGS. 8 and 9). Under the same condition, if the air-fuel ratio between the amount of intake air and the fuel injection amount for the requested load is richer than or equal to the stoichiometric air-fuel ratio, the basic injection amount is injected during the intake stroke (step S290 in FIG. 6 and (5) in FIGS. 8 and 9).

FIG. 10 is a timing chart corresponding to when the control shown in FIG. 6 is performed. The following describes a case where an intake stroke injection is performed during a low-load high-compression-ratio operation.

When there is a request for an increase in the engine load at a time point t1, although a requested load value changes in a stepwise manner, an actual load increases in a gradual manner due to, for example, a delay in the control of the amount of intake air. Likewise, regarding the compression ratio, an actual value of the compression ratio changes in a gradual manner due to, for example, an operation delay of the variable compression ratio mechanism. The fuel injection mode switches to a split injection mode that includes an intake stroke injection and a compression stroke injection.

In this case, because the intake stroke injection amount is limited in order to avoid the occurrence of pre-ignition, the intake stroke injection amount increases gradually with decreasing compression ratio. On the other hand, in order to prevent the injected fuel from splattering on the wall of the cylinder bore as a result of impacting against the top surface of the piston or to prevent the injected fuel from overflowing from the cavity of the piston, the timing for starting the compression stroke injection needs to be retarded as the piston position is lowered for reducing the compression ratio. Since the timing for ending the injection is limited by, for example, the smoke limit, an injectable amount decreases as the piston position becomes lower, or in other words, as the compression ratio becomes lower.

When the amount of fuel required for achieving the engine load exceeds the sum of the intake stroke injection upper limit amount A and the compression stroke injection upper limit amount B (i.e., a time period between a time point t2 and a time point t3), a second injection is performed during the intake stroke or a deficient amount of fuel is injected during the expansion stroke, as in (2) or (3) in FIG. 8.

When the compression ratio is sufficiently reduced so that the amount of fuel required for achieving the requested load can be injected within the intake stroke injection upper limit amount A, an intake stroke injection is solely performed thereafter (i.e., from a time point t3 onward).

Accordingly, the present embodiment exhibits the following advantages. First, because the timing for starting the compression stroke injection is retarded according to a reduction in the actual compression ratio, the positional relationship between the piston 3 and the injected fuel can be properly maintained during the transient state. This can prevent the injected fuel from splattering on the wall of the cylinder bore as a result of hitting hard against the top surface of the piston and bouncing back therefrom and can also prevent the injected fuel from overflowing from the cavity 17, thereby minimizing the emission of unburned hydrocarbon.

Second, because the timing for ending the compression-stroke injection during the transient operation state, in which the target compression ratio is varied, is limited to a time point corresponding to the smoke limit, smoke can be reliably prevented from being produced in the engine exhaust.

Third, if the fuel injection amount falls short of the target fuel injection amount as the result of limiting the timing for ending the injection to the time point corresponding to the smoke limit, an injection of fuel in the amount of the deficiency is performed independently of the compression stroke injection, whereby the total injection amount in each cycle can be prevented from falling short of the amount of fuel required for the requested load. In addition, since the deficiency amount is injected near the bottom dead center in the intake stroke (e.g., a range between 45° before the bottom dead center and 45° after the bottom dead center), the torque is prevented from being insufficient for the requested load.

Fourth, if the fuel-injection amount falls short of the target fuel injection amount as the result of limiting the timing for ending the injection to the time point corresponding to the smoke limit, the injection for the deficiency amount is performed at a retarded timing in the expansion stroke, whereby the total injection amount in each cycle can be prevented from falling short of the amount of fuel required for achieving the target air-fuel ratio.

Fifth, when the total fuel injection amount of the intake stroke injection amount and the compression stroke injection amount is smaller than the basic injection amount for the engine load, the intake stroke injection amount and the compression stroke injection amount are each set to a respective upper limit amount injection amount. In addition, when the air-fuel ratio according to the basic injection amount is lean, an additional fuel injection is performed at a retarded timing in the expansion stroke, whereas when the air-fuel ratio according to the basic injection amount is not lean, an injection for an amount of difference between the basic injection amount and the total fuel injection amount of the intake stroke injection amount and the compression stroke injection amount is performed independently of the intake stroke injection and the compression stroke injection by injecting fuel near the intake bottom dead center. Accordingly, a torque and a target air-fuel ratio suitable for the requested load can both be satisfied.

Second Embodiment

A second embodiment of the present invention will now be described.

Figure 11:
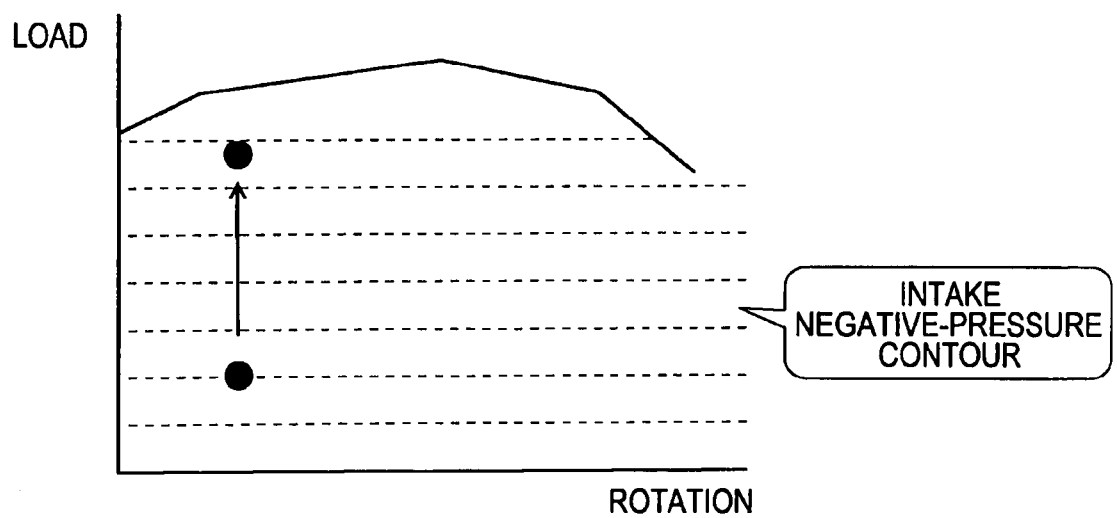
FIG. 11 is an operating-range map showing combustion methods for respective operating ranges in a second embodiment of the invention.
Figure 12:
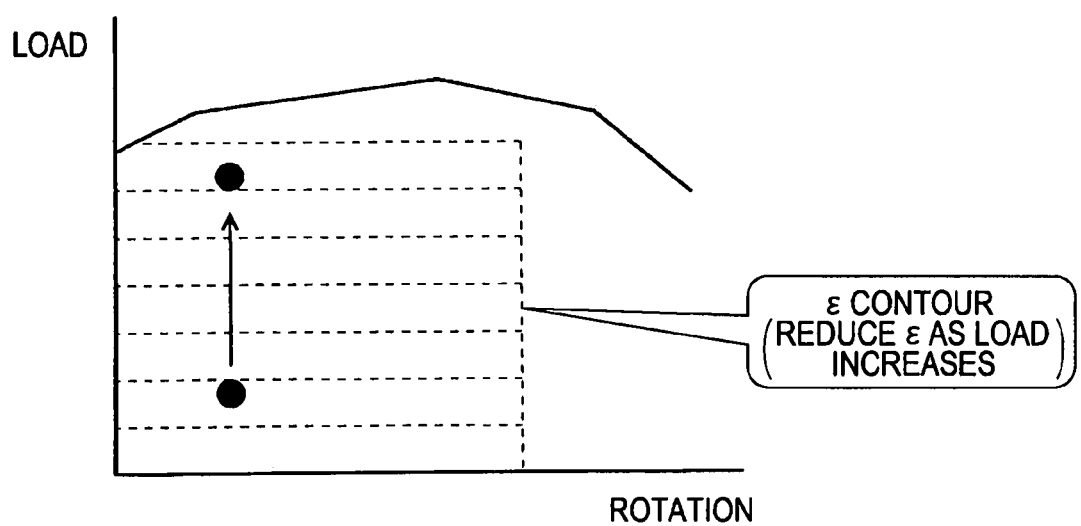
FIG. 12 is an operating-range map showing engine compression ratios in the respective operating ranges in a second embodiment of the invention.

FIGS. 11 and 12 illustrate operating range maps of an engine to which this embodiment is applied. FIGS. 11 and 12 differ from FIGS. 4 and 5 in that the engine runs at a stoichiometric air-fuel ratio in the entire rotation and load range without having a range in which the engine runs at a lean air-fuel ratio in the low-load range. In this case, an amount of intake air and an engine compression ratio are set on the basis of a requested load, and the throttle valve 12 and the motor actuator 25 are controlled accordingly.

In an engine that runs in this manner, when the engine load is to be increased in response to, for example, a request for acceleration received while the engine is running in the low-load range, if there is a response delay in the throttle valve 12, the actual amount of air becomes smaller than the amount of air suitable for the requested load. Therefore, as fuel is injected by an amount suitable for the requested load, the air-fuel ratio undesirably becomes richer than the stoichiometric air-fuel ratio. Moreover, if the reduction in the compression ratio is delayed due to a response delay or operating time of the variable compression ratio mechanism, knocking may possibly occur.

Such being the case, the control routine shown in FIG. 6 is performed, as in the first embodiment. Thus, the air-fuel ratio can be calculated from the actual amount of intake air and the fuel injection amount suitable for the requested load, and if the air-fuel ratio is rich, the fuel injection amount is limited to an amount that produces the stoichiometric air-fuel ratio. Consequently, although the output with respect to the requested load may be sacrificed, this can prevent the quality of exhaust emission from being reduced as a result of an increase in the amount of unburned hydrocarbon emitted as well as prevent knocking from occurring as a result of performing the compression-stroke injection.

Third Embodiment

A third embodiment of the present invention will now be described.

Figure 13:
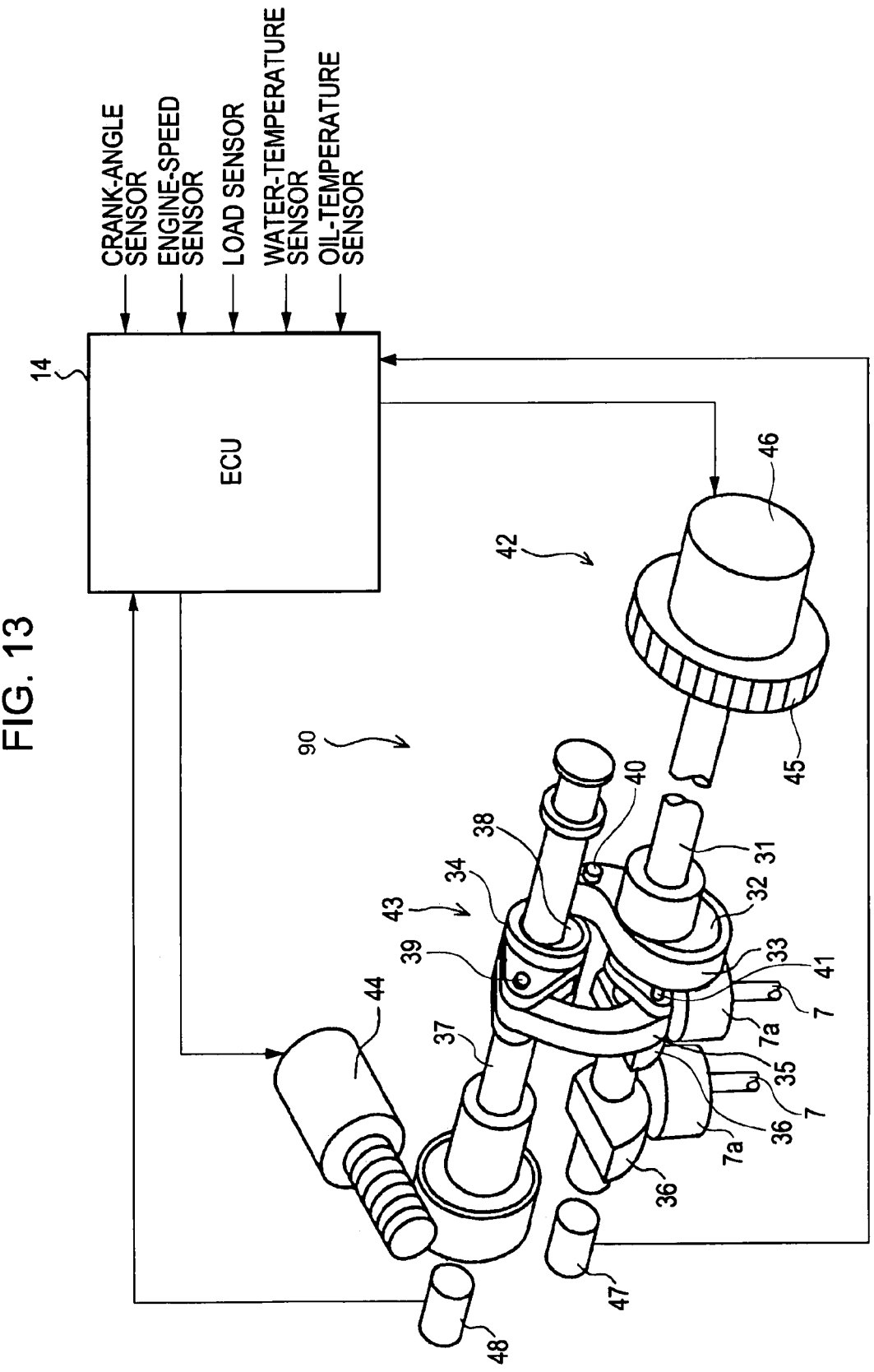
FIG. 13 illustrates an example of a variable valve system.

In the third embodiment, a variable valve system 90 shown in FIG. 13 is used in place of the intake camshaft 11 shown in FIG. 1. This variable valve system 90 is used to continuously vary the valve lifting amount and the valve operating angle of the intake valves 7 so as to control the amount of intake air. Therefore, the throttle valve 12 becomes unnecessary.

In this case, a lifting amount refers to a maximum lifting amount, and variable control of the lifting amount refers to variable control of the maximum lifting amount, but precludes a change in the lifting amount that occurs when the intake valves 7 open and close in synchronization with the rotation of the crankshaft.

The variable valve system 90 for the intake valves 7 includes a combination of a lifting amount and operating angle varying mechanism 43 that varies the lifting amount and the operating angle of the intake valves 7 and a phase varying mechanism 42 that advances or retards the phase of the central angle of the valve lift (i.e., the phase of the valve opening with respect to the rotation of the crankshaft).

The lifting amount and operating angle varying mechanism 43 and the phase varying mechanism 42 are known from, for example, Japanese Unexamined Patent Application Publication Nos. 2002-89303 and 2002-89341. The schematic configuration thereof, as shown in FIG. 13, will be briefly described below.

The lifting amount and operating angle varying mechanism 43 includes a hollow drive shaft 31 rotatably supported by a cam bracket (not shown) located at an upper part of the cylinder head; an eccentric cam 32 fixed to this drive shaft 31 by being, for example, press-fitted thereto; a control shaft 37 disposed above and in parallel to the drive shaft 31 and rotatably supported by the same cam bracket; a variable valve rocker arm 34 rockably supported by an eccentric cam portion 38 of the control shaft 37; a link member 35 whose one end is linked to one end of the variable-valve rocker arm 34 by means of a linking pin 39; and rocker cams 36 each disposed coaxially with the drive shaft 31 and linked to the other end of the link member 35 by means of a linking pin 41. In addition, the lifting amount and operating angle varying mechanism 43 also includes a drive shaft angle sensor 47 that detects the rotation angle of the drive shaft 31 and a control shaft angle sensor 48 that detects the rotation angle of the control shaft 37. The detection values of these sensors are read into the control unit 14.

The drive shaft 31 is driven by the crankshaft of the engine through a timing chain or a timing belt. The eccentric cam 32 has a circular peripheral surface. The center of the peripheral surface is offset from the axis of the drive shaft 31 by a predetermined distance. An annular portion of a link arm 33 is rotatably fitted around this peripheral surface.

The eccentric cam portion 38 is rotatably fitted in substantially the central part of the variable valve rocker arm 34. One end of the variable valve rocker arm 34 is linked to the link arm 33 by means of a linking pin 40, whereas the other end is linked to the link member 35 by means of the linking pin 39. The eccentric cam portion 38 is eccentric to the axis of the control shaft 37, whereby the center of rotation of the variable-valve rocker arm 34 changes according to the angular position of the control shaft 37.

Each rocker cam 36 is rotatably fitted around the drive shaft 31. An end of the rocker cam 36 extending perpendicularly to the axial direction of the drive shaft 31 is linked with a lower end of the link member 35 by means of the linking pin 41, as mentioned above. The underside of the rocker cam 36 is provided with a base circle surface forming an arc that is concentric with the drive shaft 31 and a cam surface extending continuously from the base circle surface to the aforementioned end to form a predetermined curve. The base circle surface and the cam surface are contactable with a valve lifter 7a provided at the upper part of each intake valve 7 in accordance with the rocking position of the rocker cam 36.

Specifically, the base circle surface defines a base circle section in which the lifting amount becomes zero. When the rocker cam 36 rocks to cause the cam surface to come into contact with the corresponding valve lifter 7a, the intake valve 7 is gradually lifted upward. The base circle section and the lifting section have a narrow ramp section provided therebetween.

The control shaft 37 is configured to be rotated within a predetermined angular range by a lifting amount and operating angle controlling motor 44 provided at one end of the control shaft 37. Power supplied to the motor 44 is controlled on the basis of a control signal from the control unit 14. The motor 44 not only has the function of rotating the control shaft 37 to a target angle when changing the operating angle, but also has a function of holding the control shaft 37 at the target angle when the engine is running. An electric current applied to the motor 44 for holding the control shaft 37 at the target angle, namely, an electric current necessary for generating a torque (holding torque) required for holding the control shaft 37 at the target angle, is referred to as a holding current.

An operation of the lifting amount and operating angle varying mechanism 43 will be described. When the drive shaft 31 rotates, the cam effect of the eccentric cam 32 causes the link arm 33 to move vertically, thus causing the variable valve rocker arm 34 to rock about the control shaft 37 acting as a rocking axis. The rocking motion of the variable-valve rocker arm 34 is transmitted to each rocker cam 36 via the link member 35, thereby rocking the rocker cam 36. The cam effect of the rocker cam 36 causes the corresponding intake valve 7 to be lifted upward. In this case, when the angle of the control shaft 37 is changed by the motor 44, the position of the center of rotation of the variable-valve rocker arm 34 changes, thus changing an initial rocking position of the rocker cam 36.

For example, when the eccentric cam portion 38 is set in its upper position, the entire variable valve rocker arm 34 is set in its upper position accordingly so that the linking pin 41 is lifted to a relatively upper position. In other words, the initial rocking position of the rocker cam 36 is tilted such that the cam surface thereof is positioned distant from the valve lifter 7a. Consequently, when the rocker cam 36 is rocked by the rotation of the drive shaft 31, the base circle surface continues to be in contact with the valve lifter 7a for a long time, whereas the cam surface comes into contact with the valve lifter 7a for only a short time. For this reason, the total lifting amount is reduced, whereby the angular range between the opening timing and the closing timing of the intake valve 7, that is, the operating angle of the intake valve 7, is reduced.

In contrast, when the eccentric cam portion 38 is set in its lower position, the entire variable valve rocker arm 34 is set in its lower position accordingly so that the aforementioned end of each rocker cam 36 is pressed to a relatively lower position. In other words, the initial rocking position of the rocker cam 36 is tilted such that the cam surface thereof is closer towards the valve lifter 7a. Consequently, when the rocker cam 36 is rocked by the rotation of the drive shaft 31, a section of the rocker cam 36 in contact with the valve lifter 7a immediately shifts from the base circle surface to the cam surface. Therefore, the total lifting amount is increased, whereby the operating angle of the intake valve 7 is increased.

Figure 14:
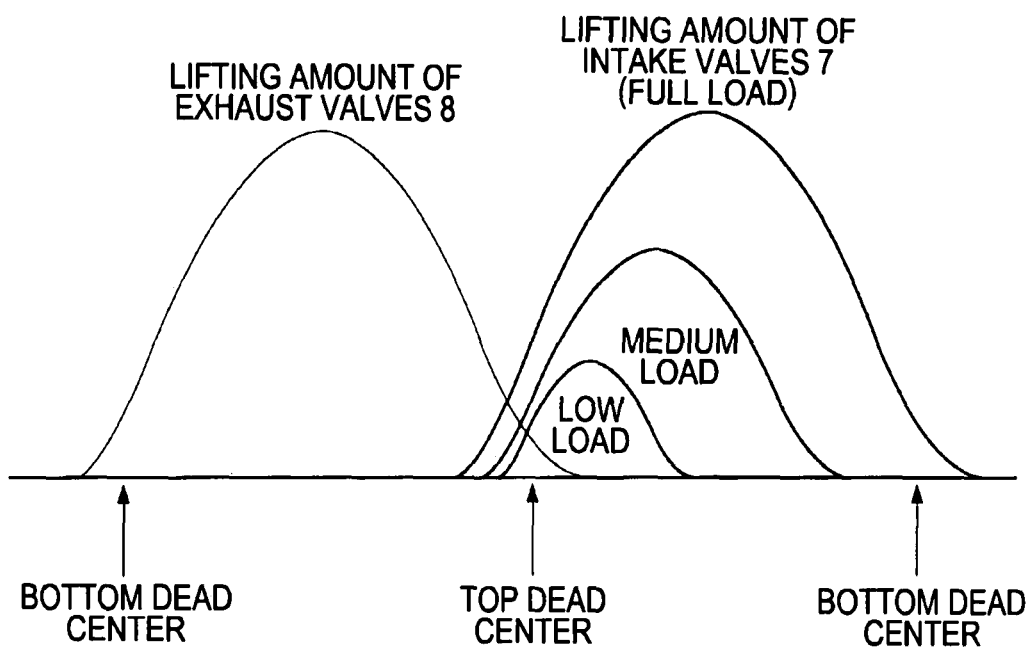
FIG. 14 is a diagram that illustrates how an operating angle and a lifting amount of an intake valve change.

Since the initial position of the eccentric cam portion 38 can be changed in a continuous manner, the valve lifting characteristic can be changed in a continuous manner accordingly. Specifically, as shown in FIG. 14, the lifting amount and the operating angle can be increased and reduced both simultaneously and continuously.

The phase varying mechanism 42 includes a sprocket 45 provided at the front end of the drive shaft 31 and a phase-controlling actuator 46 that relatively rotates the sprocket 45 and the drive shaft 31 within a predetermined angular range.

The sprocket 45 is rotated in synchronization with the crankshaft through a timing chain or a timing belt (not shown). The phase-controlling actuator 46 is controlled on the basis of a control signal from the control unit 14. By controlling this phase-controlling actuator 46, the sprocket 45 and the drive shaft 31 are relatively rotated, thereby advancing or retarding the phase of the central angle of the lift. In other words, the phase of the central angle is advanced or retarded without causing a change in the lifting characteristic curve itself. Moreover, this variation can be achieved in a continuous manner. The phase varying mechanism 42 may be of various types, such as a type equipped with a hydraulic actuator or an electromagnetic actuator, although the phase varying mechanism 42 in this embodiment is of a type equipped with a hydraulic actuator.

Figure 15:
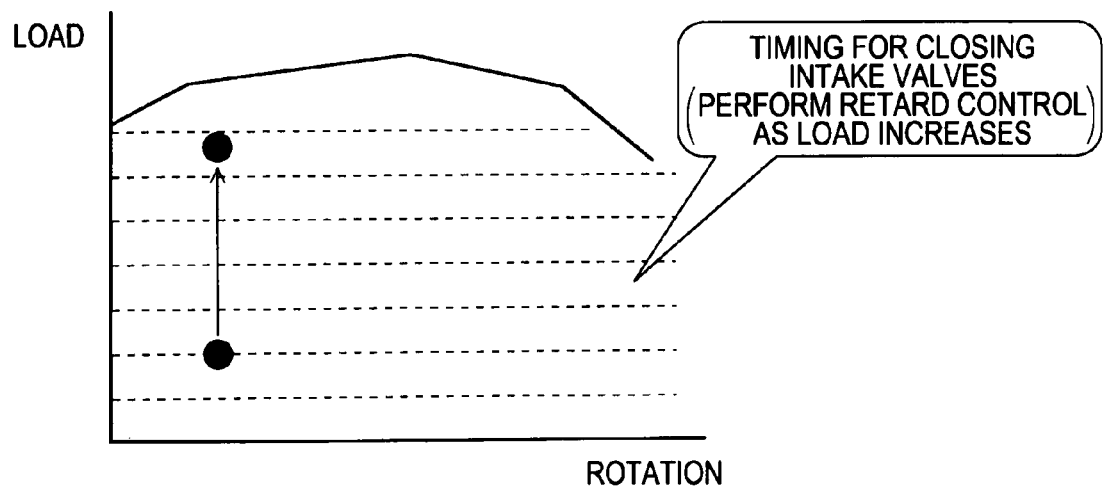
FIG. 15 is an operating-range map showing combustion methods for respective operating ranges in a third embodiment of the invention.

In the variable valve system 90 for the intake valves 7, the operating angle of the intake valves 7 is controlled by the control unit 14 on the basis of a control map in which an operating angle is allocated based on the engine speed and the engine load. Specifically, the control map is set such that, as shown in FIG. 15, for example, the intake valve closing timing is retarded (or becomes closer towards the bottom dead center) with increasing engine load. In other words, in this control map, the greater the engine load, the larger the operating angle.

Figure 16:
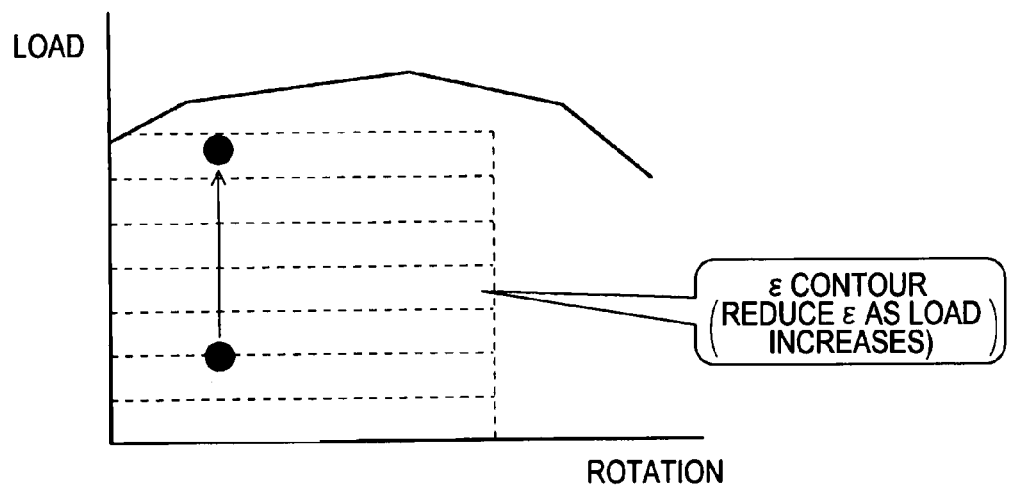
FIG. 16 is an operating-range map showing engine compression ratios in the respective operating ranges in a third embodiment of the invention.

As shown in FIG. 16, how the compression ratio is set in this embodiment is the same as in the second embodiment. Specifically, the compression ratio is reduced as the engine load increases.

When the amount of intake air is to be controlled using the intake valve closing timing, as described above, if the timing for closing the intake valves 7 is to be retarded as the load increases, a micro control value to be used when changing the intake valve closing timing towards a target control value becomes a problem. A micro control value indicates how much the intake valve closing timing is to be changed per unit time, and is determined based on how much the motor 44 and the phase controlling actuator 46 are set to operate per unit time (of, for example, 10 ms) when a command for changing the intake valve closing timing is received from the control unit 14.

If the micro control value is increased, the actual intake-valve closing timing will undesirably exceed the target control value, thus possibly resulting in overshooting where the amount of intake air becomes greater than the target amount of intake air. In contrast, if the micro control value is reduced, the time required for controlling the amount of intake air will be extended, which means that the acceleration performance will be sacrificed.

If overshooting occurs, there is a concern about the air-fuel ratio becoming too lean during the transient period in which the engine compression ratio is reduced as the engine load increases, as in the first embodiment. On the other hand, when the retardation of the intake valve closing timing is delayed, there is a concern about the air-fuel ratio becoming rich during the transient period in which the engine compression ratio is reduced as the engine load increases, as in the second embodiment.

However, in either case, the quality of exhaust emission can be prevented from being reduced and abnormal combustion, such as knocking, can be prevented from occurring by performing the control routine shown in FIG. 6, as in the first and second embodiments. Accordingly, when the variable valve system 90 is used as in this embodiment, the micro control value can be set to a larger value, thereby preventing reduced acceleration performance.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A control apparatus for a four stroke cylinder direct-injection internal combustion engine having a cylinder and a piston disposed within the cylinder, the control apparatus comprising:
  a variable compression ratio mechanism for variably controlling the engine compression ratio by changing the top dead center position of the piston;
  a fuel injection device for injecting fuel directly into the cylinder; and
  a controller for controlling the fuel injection device and the variable compression ratio mechanism;
  wherein when the actual compression ratio of the internal combustion engine is higher than a target compression ratio, the controller causes the variable compression ratio mechanism to reduce the compression ratio, and in accordance with the reduction in the compression ratio the controller controls the fuel injection device to inject an intake fuel injection amount in the intake stroke and a compression fuel injection amount in the compression stroke, and retards the timing for starting the fuel injection in the compression stroke.

2. The control apparatus according to claim 1,
  wherein the controller limits the intake fuel injection amount to an intake stroke injection upper limit amount that is smaller than a pre-ignition intake fuel injection amount; and
  wherein the controller limits the compression fuel injection amount to a compression stroke injection upper limit amount that can be injected prior to a time point in the compression stroke corresponding to a smoke limit.

3. The control apparatus according to claim 2, wherein when the sum of the intake fuel injection amount and the compression fuel injection amount is smaller than a target fuel injection amount, the controller causes the fuel injection device to perform an additional fuel injection that is independent of the fuel injection in the intake stroke and the fuel injection in the compression stroke by injecting near intake bottom dead center of the piston an amount of fuel equivalent to the difference between the target injection amount and the sum of the intake fuel injection amount and the compression fuel injection amount.

4. The control apparatus according to claim 2, wherein when the sum of the intake fuel injection amount and the compression fuel injection amount is smaller than a target fuel injection amount, the controller causes the fuel injection device to inject at a retarded timing in the expansion stroke an additional amount of fuel equivalent to the difference between the target injection amount and the sum of intake fuel injection amount and the compression fuel injection amount.

5. The control apparatus according to claim 2,
  wherein the controller determines a basic fuel injection amount corresponding to an engine load;
  wherein when the sum of the intake stroke injection upper limit and the compression stroke upper injection limit is smaller than the basic fuel injection amount, the controller sets the intake fuel injection amount as the intake stroke injection upper limit amount and the compression fuel injection amount as the compression stroke injection upper limit amount;
  wherein when an air-fuel ratio based on the basic fuel injection amount is equal to or richer than a stoichiometric air-fuel ratio, the controller causes the fuel injection device to perform an additional fuel injection that is independent of the fuel injection in the intake stroke and the fuel injection in the compression stroke by injecting near intake bottom dead center of the piston an amount of fuel equivalent to the difference between the basic fuel injection amount and the sum of the intake fuel injection amount and the compression fuel injection amount; and wherein when the air-fuel ratio based on the basic fuel injection amount is leaner than the stoichiometric air-fuel ratio, the controller causes the fuel injection device to inject at a retarded timing in the expansion stroke an amount of fuel equivalent to the difference between the basic fuel injection amount and an amount of fuel for making the air-fuel ratio equal to the stoichiometric air-fuel ratio.

6. The control apparatus according to claim 2,
wherein the controller determines a basic fuel injection amount corresponding to an engine load;
wherein when the sum of the intake stroke injection upper limit and the compression stroke upper injection limit is smaller than the basic fuel injection amount, the controller sets the intake fuel injection amount as the intake stroke injection upper limit amount and the compression fuel injection amount as the compression stroke injection upper limit amount;
wherein when an air-fuel ratio based on the basic fuel injection amount is equal to or richer than a stoichiometric air-fuel ratio, the controller causes the fuel injection device to perform an additional fuel injection that is independent of the fuel injection in the intake stroke and the fuel injection in the compression stroke by injecting near intake bottom dead center of the piston an amount of fuel equivalent to the difference between the basic fuel injection amount and the sum of the intake fuel injection amount and the compression fuel injection amount; and
wherein when the air-fuel ratio based on the basic fuel injection amount is leaner than the stoichiometric air-fuel ratio, the controller causes the fuel injection device to inject at a retarded timing in the expansion stroke an additional amount of fuel for making the air-fuel ratio equal to the stoichiometric air-fuel ratio.

7. The control apparatus according to claim 5, wherein when the basic fuel injection amount is determined to greater than the amount of fuel for making the air-fuel ratio equal to the stoichiometric ratio, the controller limits the basic injection amount to be equal to the amount of fuel for making the air-fuel ratio equal to the stoichiometric air-fuel ratio.

8. The control apparatus according to claim 2,
wherein the controller determines a basic fuel injection amount corresponding to an engine load;
wherein when the sum of the intake stroke injection upper limit amount and the compression stroke injection upper limit amount is greater than or equal to the basic fuel injection amount, the controller sets the intake fuel injection amount as the intake stroke injection upper limit amount;
wherein when an air-fuel ratio based on the basic fuel injection amount is equal to or richer than a stoichiometric air-fuel ratio, the controller sets the compression fuel injection amount as the difference between the basic fuel injection amount and the intake fuel injection amount; and
wherein when the air-fuel ratio based on the basic fuel injection amount is leaner than the stoichiometric air-fuel ratio, the controller sets the compression fuel injection amount as the difference between an additional amount of fuel for making the air-fuel ratio equal to the stoichiometric air-fuel ratio and the intake fuel injection amount.

9. The control apparatus according to claim 1,
wherein the controller determines a basic fuel injection amount corresponding to an engine load;
wherein when an air-fuel ratio based on the basic fuel injection amount is leaner than a stoichiometric air-fuel ratio, the controller sets the intake fuel injection amount to be equal to the basic fuel injection amount and the compression fuel injection amount to be equal to the difference between the amount of fuel required for a stoichiometric air-fuel ratio and the basic fuel injection; and
wherein when an air-fuel ratio based on the basic fuel injection amount is equal to or richer than a stoichiometric air-fuel ratio, the controller limits the basic injection amount to be equal to the amount of fuel required for a stoichiometric air-fuel ratio, and sets the intake fuel injection amount to be equal to the basic injection amount and the compression injection amount to be zero.

10. The control apparatus according to claim 1,
wherein when the actual compression ratio is equal to or greater than a predetermined compression ratio at which abnormal combustion may occur, the controller determines an intake stroke injection upper limit amount and a compression stroke injection upper limit amount; and
wherein when the sum of the intake stroke injection upper limit amount and the compression stroke injection upper limit amount is greater than a basic fuel injection amount corresponding to an engine load,
the intake fuel injection amount is set to be equal to the intake stroke injection upper limit amount, and
when the basic fuel injection amount is less than an injection amount for making an air-fuel ratio equal to a stoichiometric air-fuel ratio, the compression fuel injection amount is set to be equal to the difference between the injection amount for making the air-fuel ratio equal to the stoichiometric air-fuel ratio and the intake fuel injection amount, and when the basic fuel injection amount is equal to or greater than the injection amount for making the air-fuel ratio equal to the stoichiometric air-fuel ratio, the compression fuel injection amount is set to be equal to the difference between the basic fuel injection amount and the intake fuel injection amount.

11. The control apparatus according to claim 1,
wherein when the actual compression ratio is equal to or greater than a predetermined compression ratio at which abnormal combustion may occur, the controller determines an intake stroke injection upper limit amount and a compression stroke injection upper limit amount; and
wherein when the sum of the intake stroke injection upper limit amount and the compression stroke injection upper limit amount is not greater that a basic fuel injection amount corresponding to an engine load,
the intake fuel injection amount is set to be equal to the intake stroke injection upper limit amount,
the compression fuel injection amount is set to be equal to the compression stroke injection upper limit amount, and
when the basic fuel injection amount is less than an injection amount for making an air-fuel ratio equal to a stoichiometric air-fuel ratio, an expansion fuel injection amount equal to the difference between the injection amount for making the air-fuel ratio equal to the stoichiometric air-fuel ratio and the sum of the intake fuel injection amount and the compression fuel injection amount is injected at a retarded timing in the expansion stroke, and when the basic fuel injection amount is equal to or greater than the injection amount for making the air-fuel ratio equal to the stoichiometric air-fuel ratio, a separate additional intake fuel injection amount equal to the difference between the basic fuel injection amount and the sum of the intake fuel injection amount and the compression fuel injection amount is injected near intake bottom dead center of the piston.

12. The control apparatus according to claim 1,
wherein when the actual compression ratio is less than a predetermined compression ratio at which abnormal combustion may occur, the intake fuel injection amount is set to be a basic fuel injection amount corresponding to an engine load and the compression fuel injection amount is set to be zero; and
wherein when the basic fuel injection amount is less than an injection amount for making an air-fuel ratio equal to a stoichiometric air-fuel ratio, an expansion fuel injection amount equal to the difference between the injection amount for making the air-fuel ratio equal to the stoichiometric air-fuel ratio and the sum of the intake fuel injection amount and the compression fuel injection amount is injected at a retarded timing in the expansion stroke.

13. A method for controlling fuel injection in a four stroke cylinder direct-injection internal combustion engine having a cylinder and a piston disposed within the cylinder, the method comprising:
when the actual compression ratio of the internal combustion engine is higher than a target compression ratio, reducing the compression ratio, and in accordance with the reduction in the compression ratio injecting an intake fuel injection amount in the intake stroke and a compression fuel injection amount in the compression stroke, and retarding the timing for starting the fuel injection in the compression stroke.

14. The method according to claim 13, further comprising:
limiting the intake fuel injection amount to an intake stroke injection upper limit amount that is smaller than a pre-ignition intake fuel injection amount; and
limiting the compression fuel injection amount to a compression stroke injection upper limit amount that can be injected prior to a time point in the compression stroke corresponding to a smoke limit.

15. The method according to claim 14, further comprising:
when the sum of the intake fuel injection amount and the compression fuel injection amount is smaller than a target fuel injection amount, independently injecting an additional fuel injection amount near intake bottom dead center of the piston equivalent to the difference between the target injection amount and the sum of the intake fuel injection amount and the compression fuel injection amount.

16. The method according to claim 14, further comprising:
when the sum of the intake fuel injection amount and the compression fuel injection amount is smaller than a target fuel injection amount, injecting at a retarded timing in the expansion stroke an additional amount of fuel equivalent to the difference between the target injection amount and the sum of intake fuel injection amount and the compression fuel injection amount.

17. The method according to claim 14, further comprising:
determining a basic fuel injection amount corresponding to an engine load;
when the sum of the intake stroke injection upper limit and the compression stroke upper injection limit is smaller than the basic fuel injection amount, setting the intake fuel injection amount as the intake stroke injection upper limit amount and the compression fuel injection amount as the compression stroke injection upper limit amount;
when an air-fuel ratio based on the basic fuel injection amount is equal to or richer than a stoichiometric air-fuel ratio, independently injecting an additional fuel injection amount near intake bottom dead center of the piston equivalent to the difference between the basic fuel injection amount and the sum of the intake fuel injection amount and the compression fuel injection amount; and
when the air-fuel ratio based on the basic fuel injection amount is leaner than the stoichiometric air-fuel ratio, injecting at a retarded timing in the expansion stroke an additional amount of fuel equivalent to the difference between the basic fuel injection amount and an amount of fuel for making the air-fuel ratio equal to the stoichiometric air-fuel ratio.

18. The method according to claim 14, further comprising:
determining a basic fuel injection amount corresponding to an engine load;
when the sum of the intake stroke injection upper limit and the compression stroke upper injection limit is smaller than the basic fuel injection amount, setting the intake fuel injection amount as the intake stroke injection upper limit amount and the compression fuel injection amount as the compression stroke injection upper limit amount;
when an air-fuel ratio based on the basic fuel injection amount is equal to or richer than a stoichiometric air-fuel ratio, independently injecting an additional fuel injection amount near intake bottom dead center of the piston equivalent to the difference between the basic fuel injection amount and the sum of the intake fuel injection amount and the compression fuel injection amount; and
when the air-fuel ratio based on the basic fuel injection amount is leaner than the stoichiometric air-fuel ratio, injecting at a retarded timing in the expansion stroke an additional amount of fuel for making the air-fuel ratio equal to the stoichiometric air-fuel ratio.

19. The method according to claim 17, further comprising:
when the basic fuel injection amount is determined to be greater than the amount of fuel for making the air-fuel ratio equal to the stoichiometric ratio, limiting the basic injection amount to be equal to the amount of fuel for making the air-fuel ratio equal to the stoichiometric air-fuel ratio.

20. A control apparatus for a four stroke cylinder direct-injection internal combustion engine having a cylinder and a piston disposed within the cylinder, the control apparatus comprising:
variable compression ratio means for variably controlling the engine compression ratio by changing the top dead center position of the piston;
fuel injection means for injecting fuel directly into the cylinder; and
control means for controlling the fuel injection means and the variable compression ratio means;
wherein when the actual compression ratio of the internal combustion engine is higher than a target compression ratio, the variable compression ratio means reduces the compression ratio, and in accordance with the reduction in the compression ratio the fuel injecting means injects an intake fuel injection amount in the intake stroke and a compression fuel injection amount in the compression stroke, and the control means retards the timing for starting the fuel injection in the compression stroke.

* * * * *